(12) United States Patent
Yabu

(10) Patent No.: US 8,929,669 B2
(45) Date of Patent: Jan. 6, 2015

(54) IMAGE EVALUATION APPARATUS THAT CALCULATES AN IMPORTANCE DEGREE OF EACH OF A PLURALITY OF IMAGES

(75) Inventor: Hiroshi Yabu, Hyogo (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 462 days.

(21) Appl. No.: 13/391,928

(22) PCT Filed: Jun. 8, 2011

(86) PCT No.: PCT/JP2011/003250
§ 371 (c)(1),
(2), (4) Date: Feb. 23, 2012

(87) PCT Pub. No.: WO2011/161889
PCT Pub. Date: Dec. 29, 2011

(65) Prior Publication Data
US 2012/0148165 A1    Jun. 14, 2012

(30) Foreign Application Priority Data
Jun. 23, 2010 (JP) .................................. 2010-142135

(51) Int. Cl.
G06K 9/62 (2006.01)
G06F 17/30 (2006.01)
G06K 9/00 (2006.01)

(52) U.S. Cl.
CPC .... *G06F 17/30247* (2013.01); *G06F 17/30256* (2013.01); *G06K 9/00677* (2013.01); *G06K 9/6224* (2013.01)
USPC ................................... 382/225; 707/E17.02

(58) Field of Classification Search
CPC ................................................ G06F 17/30247

USPC .................. 382/224–225; 707/722–723, 735, 707/E17.02; 706/12, 14
See application file for complete search history.

(56) References Cited

U.S. PATENT DOCUMENTS 7,953,690 B2 * 5/2011 Luo et al. ......................... 706/47
8,036,417 B2 * 10/2011 Gallagher et al. ............ 382/100
(Continued)

FOREIGN PATENT DOCUMENTS

JP   8-315106   11/1996
JP   2003-87435   3/2003
(Continued)

OTHER PUBLICATIONS

International Search Report issued Jul. 12, 2011 in International (PCT) Application No. PCT/JP2011/003250.
(Continued)

*Primary Examiner* — Samir Ahmed
(74) *Attorney, Agent, or Firm* — Wenderoth, Lind & Ponack, L.L.P.

(57) ABSTRACT

An image evaluation apparatus is provided, which calculates a characteristic value indicating a state of appearance of objects corresponding to person a and person b appearing in image A and an object corresponding to person b appearing in image B. Subsequently, the image evaluation apparatus specifies person b' as the photographer of image B and calculates a likelihood degree indicating accuracy of the determination. Further, the image evaluation apparatus calculates an importance degree of each of images A and B according to the characteristic values of person a and person b appearing in image A and image B and the likelihood degree of the photographer of image B.

16 Claims, 40 Drawing Sheets

(56) References Cited

U.S. PATENT DOCUMENTS

| | | | |
|---|---|---|---|
| 2006/0274949 A1 | 12/2006 | Gallagher et al. | |
| 2007/0250529 A1* | 10/2007 | Beato et al. | 707/102 |
| 2009/0135269 A1* | 5/2009 | Nozaki et al. | 348/222.1 |
| 2009/0192967 A1 | 7/2009 | Luo et al. | |
| 2010/0302393 A1* | 12/2010 | Olsson et al. | 348/222.1 |
| 2011/0029887 A1* | 2/2011 | Pearson et al. | 715/743 |

FOREIGN PATENT DOCUMENTS

| | | |
|---|---|---|
| JP | 2003-274320 | 9/2003 |
| JP | 2005-157961 | 6/2005 |
| JP | 2007-80014 | 3/2007 |
| JP | 2007-135065 | 5/2007 |
| JP | 2008-543224 | 11/2008 |
| WO | 2006/130542 | 12/2006 |
| WO | 2009/094142 | 7/2009 |

OTHER PUBLICATIONS

Kazuhiro Hotta et al., "Face Recognition Using Weighted Matching by Information of Gabor Features", The Institute of Electronics, Information and Communication Engineers, Technical Report of IEICE, HIP May 2000, pp. 31-38 (along with English translation).

John C. Platt et al., "PhotoTOC: Automatic Clustering for Browsing Personal Photographs", Fourth IEEE Pacific Rim Conference on Multimedia (2003).

Brin Lawrence et al. "The PageRank Citation Ranking. Bringing Order to the Web", Jan. 29, 1998, pp. 1-17.

* cited by examiner

FIG.4
(a)
Image A 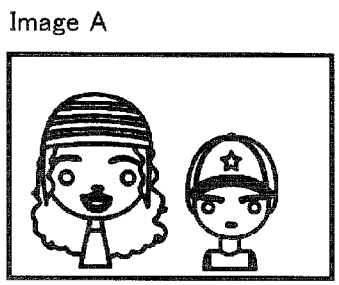  Image B 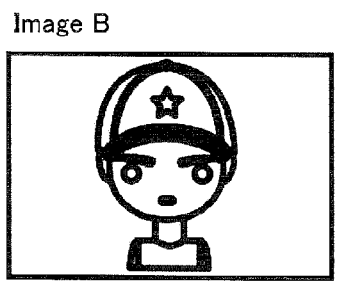  Image C 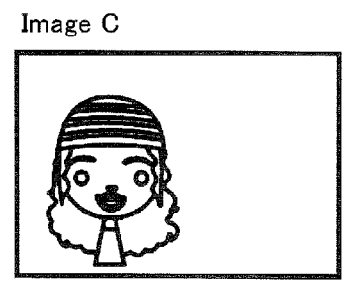
↓ S32
(b)
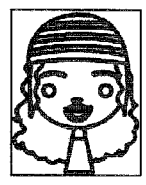   
F1　　　F2　　　F3　　　F4
↓ S33
(c)
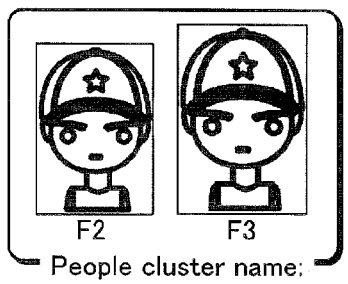
People cluster name: person a
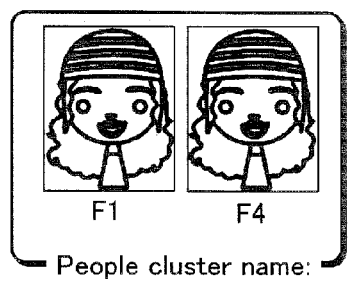
People cluster name: person b FIG.9A
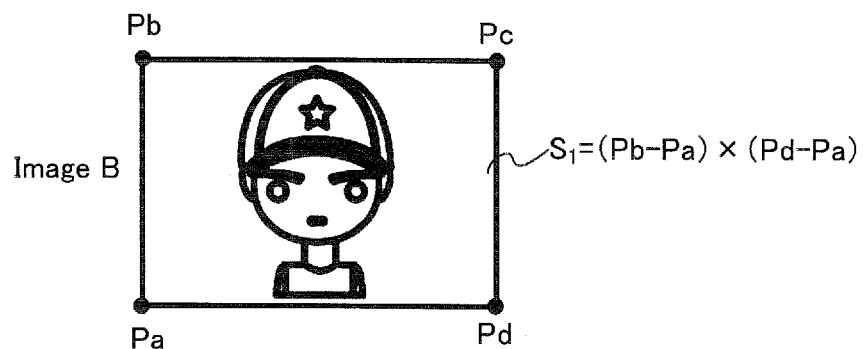
Image B    $S_1 = (Pb-Pa) \times (Pd-Pa)$
FIG.9B
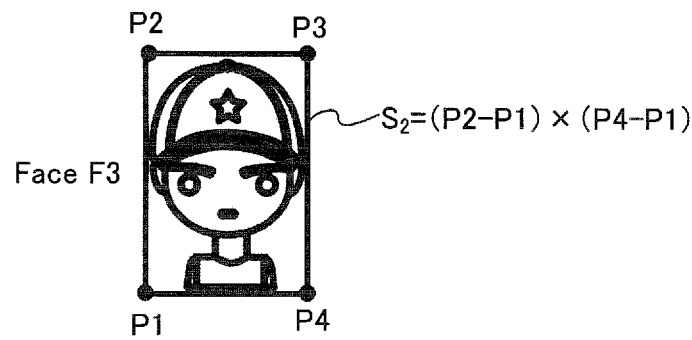
Face F3    $S_2 = (P2-P1) \times (P4-P1)$
FIG.9C
Occupation degree = $S_2/S_1$

FIG.16C

Photographer density degree
of person f for image N $$\sum \frac{1}{d(i,j)} = 1/\underline{d(N,M)} + 1/\underline{d(N,O)} = 1/1 + 1/1 = 2$$

Distance between image N and image M

Distance between image N and image O

FIG.22

| Image | Photographer likelihood degree of person a | Photographer likelihood degree of person b | Total photographer likelihood degree of image |
|---|---|---|---|
| A | 0 | 0 | 0 |
| B | 0 | 0.6 | 0.6 |
| C | 0.7 | 0 | 0.7 |
| D | 0.4 | 0.6 | 1.0 |
| Total photographer likelihood degree of people cluster | 1.1 | 1.2 | — |

44 Photographer likelihood degree storing unit

FIG.31

| Link destination / Link source | Dummy z | Image A | Image B | Person a (photo subject) | Person b (photo subject) | Person b' (photographer) |
|---|---|---|---|---|---|---|
| Dummy z | 0 | 0.25 | 0.25 | 0.25 | 0.25 | 0 |
| Image A | 0.6 | 0 | 0 | 0.2 | 0.2 | 0 |
| Image B | 0.45 | 0 | 0 | 0.2 | 0 | 0.35 |
| Person a (photo subject) | 0.8 | 0.1 | 0.1 | 0 | 0 | 0 |
| Person b (photo subject) | 0.4 | 0.1 | 0 | 0 | 0 | 0.5 |
| Person b' (photographer) | 0 | 0 | 0.5 | 0.5 | 0 | 0 |

Graph storing unit 45

FIG.33

$$M = \begin{pmatrix} 0 & 0.25 & 0.25 & 0.25 & 0.25 & 0 \\ 0.6 & 0 & 0 & 0.2 & 0.2 & 0 \\ 0.45 & 0 & 0 & 0.2 & 0 & 0.35 \\ 0.8 & 0.1 & 0.1 & 0 & 0 & 0 \\ 0.4 & 0.1 & 0 & 0 & 0 & 0.5 \\ 0 & 0 & 0.5 & 0.5 & 0 & 0 \end{pmatrix}$$

Dominant eigenvector P = ( 0.80, 0.62, 0.09, 0.09, 0.18, 0.18 )

Components of image A and image B

Components of person a and person b (b) ← S326   ↓ S326

| Component of image A | Component of image B |
|---|---|
| 0.62 | 0.09 |

| Component of person a | Component of person b |
|---|---|
| 0.09 | 0.18 |

(c) ↓ S327   ↓ S327

| Image evaluation value of image A | Image evaluation value of image B |
|---|---|
| 0.87 | 0.13 |

| Importance degree of person a | Importance degree of person b |
|---|---|
| 0.33 | 0.67 |

FIG.36A

Comparison of frequency degrees

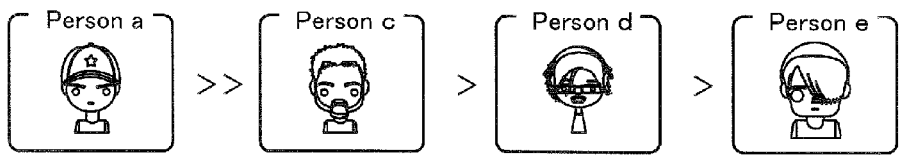

FIG.36B

Image H:
image of person e
photographed
by person a

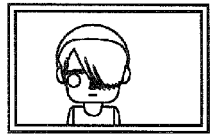

Image I:
image of person d
photographed
by person c

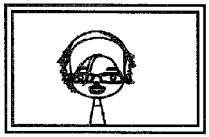

Image J:
image where
person a and
person e
appear together

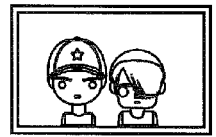

Image K:
image where
person c and
person d
appear together

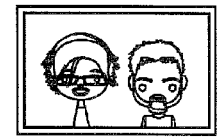

FIG.36C
Comparison of evaluation scores

Ranking where person a is main subject person
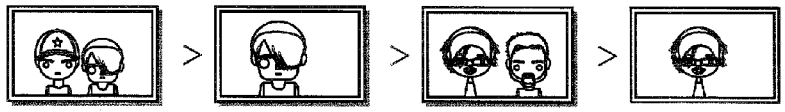

Ranking where person c is main subject person
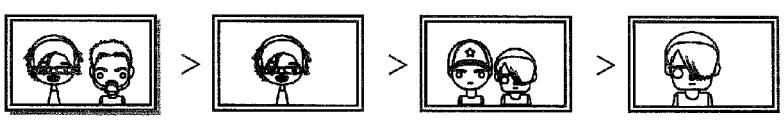

FIG.38A
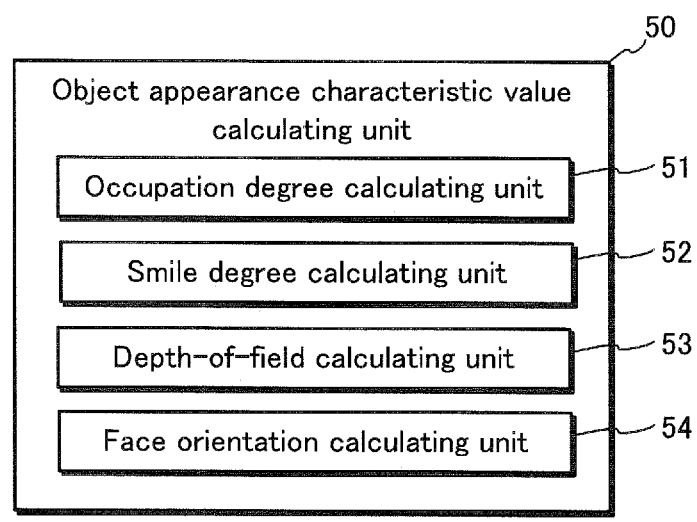
FIG.38B    FIG.38C
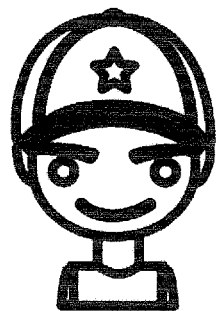 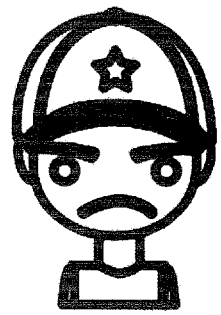

FIG.39
(a)
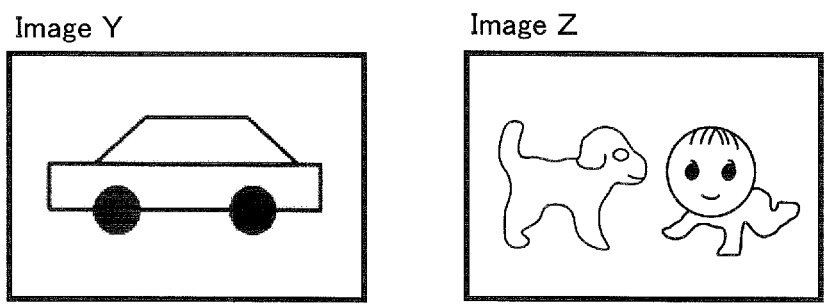
↓ S32
(b)
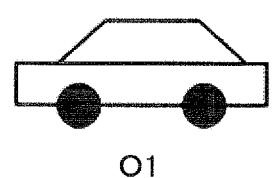  
O1　　　　　O2　　　　O3

FIG.40

| January 2011 | | | | February 2011 | | | |
|---|---|---|---|---|---|---|---|
| Main subject person \ Ranking | Person a | Person b | Person c | Main subject person \ Ranking | Person a | Person b | Person c |
| First | Person k | Person k | Person l | First | Person k | Person n | Person m |
| Second | Person m | Person n | Person k | Second | Person m | Person k | Person l |
| Third | Person n | Person m | Person m | Third | Person n | Person m | Person k |
| ... | ... | ... | ... | ... | ... | ... | ... |

IMAGE EVALUATION APPARATUS THAT CALCULATES AN IMPORTANCE DEGREE OF EACH OF A PLURALITY OF IMAGES

TECHNICAL FIELD

The present invention relates to a technology for evaluating each image in a vast collection of images possessed by a user so as to support the user in searching for and selecting images of importance.

DESCRIPTION OF THE RELATED ART

The recent spread of digital cameras and the increase in storage capacity of recording media has lead to a rapid increase in the number of images possessed by a single user. As a result, now it is becoming possible for a single user to possess an enormous number of images.

Under these circumstances, one method that supports a user in searching for and selecting an image that he or she would like to view from among a large number of images is a commonly-known method of providing an evaluation and a rank to each of the images in the user's collection.

For instance, a method is known of obtaining, for each of the images in the collection, a value indicating evaluation by performing calculation according to the number of times certain operations (printing, slideshow viewing, and etc.) have been performed (refer to Patent Literature 1).

CITATION LIST

Patent Literature

[Patent Literature 1]
  Japanese Patent Application Publication No. 2007-135065
[Patent Literature 2]
  Japanese Patent Application Publication No. 2007-080014

SUMMARY OF INVENTION

Technical Problem

However, when applying the method disclosed in Patent Literature 1, the user is required to conduct a certain number of user operations prior to the calculation of an evaluation value. This is problematic since, when no user operations or only a limited number of user operations have been made prior to the calculation of an evaluation value, the evaluation value obtained through the calculation will not be in accordance with the user's intentions.

In addition, although there exists a conventional technology of calculating an evaluation value for an image according to people appearing in the image, no technology has yet been introduced of calculating an evaluation value for an image according to a person having photographed the image (referred to hereinafter as a "photographer" of an image).

Concerning such a technology, the inventor of the present invention and others, through much consideration, have arrived at the conception that results of evaluation performed with respect to an image would be more appropriate if the calculation of the evaluation value of the image is performed while taking into account the photographer of the image.

The present invention has been made under such a conception, and provides an image evaluation apparatus that performs evaluation of an image while taking into account the photographer having photographed the image.

Solution to the Problems

In view of the above-described problems, the present invention provides an image evaluation apparatus that calculates an importance degree of each of a plurality of images including objects, the image evaluation apparatus comprising: a characteristic value calculating unit that calculates, for an object appearing in an image, a characteristic value indicating a state of appearance of the object; a photographer extracting unit that determines a photographer of the image and that calculates a likelihood degree indicating accuracy of the determination of the photographer; and an evaluation unit that calculates an importance degree of the image according to the characteristic value and the likelihood degree.

Advantageous Effects of the Invention

The image evaluation apparatus pertaining to the present invention performs evaluation of an image while taking into account the photographer having photographed the image.

BRIEF DESCRIPTION OF THE DRAWINGS

FIG. 4 illustrates a flow of object clustering processing.

FIGS. 9A, 9B, and 9C illustrate a flow of the occupation degree calculating processing.

FIGS. 16A, 16B, 16C, and 16D illustrate a flow of the photographer determining processing for determining photographer B.

FIG. 22 illustrates contents stored in a photographer likelihood degree storing unit 44.

FIG. 31 illustrates contents stored in a graph storing unit 45.

FIG. 33 illustrates a specific example of an adjacency matrix M.

FIG. 34 provides an explanation of a flow of processing in obtaining an evaluation value for each of images and an image importance degree for each of objects from components of a dominant eigenvector P.

FIGS. 36A, 36B, and 36C illustrate the influence a main subject person has on evaluation degrees of images.

FIG. 38A illustrates a modification of an object appearance characteristic value calculating unit 50, FIG. 38B illustrates an example of a face for which a smile degree calculating unit 52 calculates a high smile degree, and FIG. 38C illustrates an example of a face for which the smile degree calculating unit 52 calculates a low smile degree.

FIG. 39 illustrates a flow of processing in extracting various objects from images.

FIG. 40 illustrates importance degrees of people within a specific period of time.

DESCRIPTION OF EMBODIMENT

Embodiment 1

In the following, description is provided on an embodiment of the present invention with reference to the accompanying drawings.
<Structure>

Figure 1:
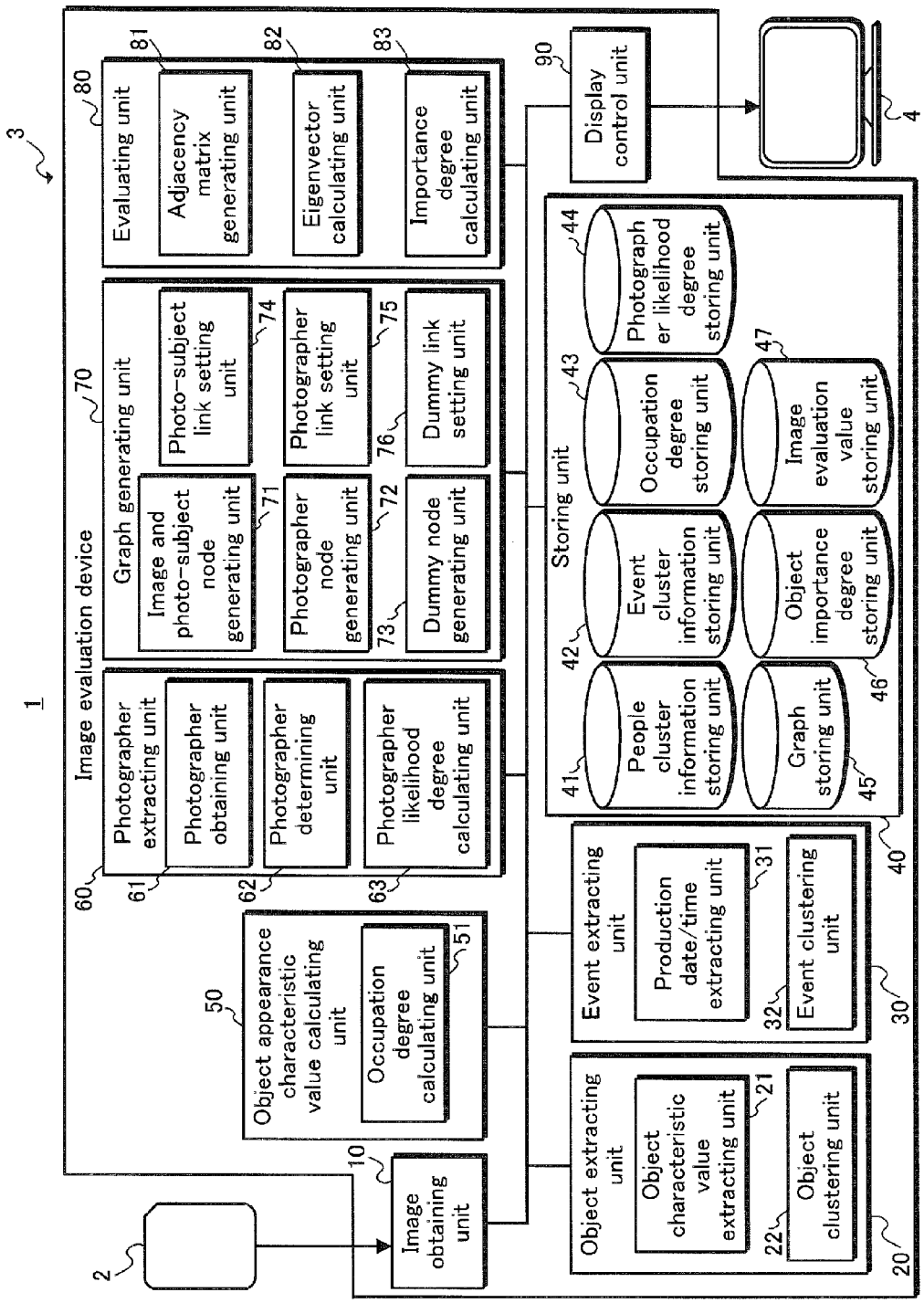
FIG. 1 is a functional block diagram of an image evaluation system 1.

As illustrated in FIG. 1, an image evaluation system 1 includes: an SD memory card 2; an image evaluation device 3; and a display 4.

The image evaluation device 3 includes: an image obtaining unit 10; an object extracting unit 20 (including an object characteristic value extracting unit 21 and an object clustering unit 22); an event extracting unit 30 (including a production date/time extracting unit 31 and an event clustering unit 32); a storing unit 40 (including a people cluster information storing unit 41, an event cluster information storing unit 42, an occupation degree storing unit 43, a photographer likelihood degree storing unit 44, a graph storing unit 45, an object importance degree storing unit 46, and an image evaluation value storing unit 47); an object appearance characteristic value calculating unit 50 (including an occupation degree calculating unit 51); a photographer extracting unit 60 (including a photographer obtaining unit 61, a photographer determining unit 62, and a photographer likelihood degree calculating unit 63); a graph generating unit 70 (including an image and photo-subject node generating unit 71, a photographer node generating unit 72, a dummy node generating unit 73, a photo-subject link setting unit 74, a photographer link setting unit 75, and a dummy link setting unit 76); an evaluating unit 80 (including an adjacency matrix generating unit 81, an eigenvector calculating unit 82, and an importance degree calculating unit 83); and a display control unit 90.

The image obtaining unit 10 is, for instance, composed of an SD card reader having an SD card slot, and obtains image data corresponding to images from an SD memory card 4 which is inserted into the SD card slot.

The object extracting unit 20 extracts an object characteristic value for each of objects appearing in the image data obtained by the image obtaining unit 10. Here, the objects appearing in the images each correspond to a person (hereinafter, an object corresponds to a person appearing in an image unless otherwise stated). Further, the object extracting unit 20 performs clustering according to the object characteristic values extracted.

In specific, the extracting of object characteristic values is performed by the object characteristic value extracting unit 21.

A commonly-known method, such as the extraction method which involves the use of the Gabor filter (refer to Referenced Document 1, description on which is provided in the following), for instance, may be applied as the method for extracting object characteristic values.

When the extracting of object characteristic values has been completed, the object clustering unit 22 performs clustering with respect to the objects of the people appearing in the images according to the object characteristic values extracted.

The object clustering unit 22 then stores people cluster information (object cluster information), which indicates the result of the clustering, to the people cluster information storing unit 41.

Here, the k-means clustering method (refer to Referenced Document 2) may be applied as the clustering method. The k-means method is one of the non-hierarchical clustering methods (methods of clustering where clustering is performed by associating each fixed cluster with a cluster representative).

The event extracting unit 30 extracts production date/time information from the images obtained by the image obtaining unit 10, and classifies (clusters) the images into multiple events according to the production date/time information extracted. Further, the event extracting unit 30 stores event cluster information, which indicates the result of the event clustering, to the event cluster information storing unit 42.

The production date/time extracting unit 31 extracts production date/time information from metadata provided to each of the images. The metadata as referred to here may be, for instance, Exif information in a format specified in the Exif (Exchangeable image file format) standard.

When the production date/time information has been extracted, the event clustering unit 32 performs clustering where the multiple images are classified into several different event clusters.

A commonly-known method may be applied as the clustering method applied for the clustering of images into event clusters. For instance, a method may be applied where a given period of time is set as a threshold, and images are classified into different event clusters when the difference between the production date/times of the images exceed the threshold (refer to Referenced Document 2).

The storing unit 40 stores various types of information. The storing unit 40 may be composed of hardware such as a RAM (Random Access Memory) and a HDD (Hard Disk Drive), for instance.

The object appearance characteristic value calculating unit 50 refers to the people cluster information storing unit 41 and thereby calculates an "object appearance characteristic value" for each of the objects appearing in the images.

The "object appearance characteristic value" is a value indicating a state of appearance of the corresponding object in an image.

In the present embodiment, description is provided of an occupation degree calculated by the occupation degree calculating unit 51 as one example of the object appearance characteristic value. The "occupation degree" indicates a proportion that an object belonging to a people cluster occupies in an image.

The occupation degrees of objects appearing in the images calculated by the occupation degree calculating unit 51 are stored to the occupation degree storing unit 43.

The photographer extracting unit 60 includes the photographer obtaining unit 61, the photographer determining unit 62, and the photographer likelihood degree calculating unit 63. The photographer obtaining unit 61 obtains photographer information for each of images (referred to hereinafter as "target images") obtained by the image obtaining unit 10. The photographer determining unit 62 makes a determination of a photographer of a target image. The photographer likelihood degree calculating unit 63 calculates a likelihood degree (a degree indicating the accuracy of the determination) for the photographer having been determined.

The three methods as introduced in the following are applied in the determination of a photographer of a target image.

More specifically, the three methods as introduced in the following are applied in such an order that first, determination according to method Z is attempted, then, when the photographer of the target image cannot be determined by applying method Z, determination according to method A is attempted, and finally, when the photographer of the target image cannot be determined by applying method A, determination according to method B is conducted.

(1) Method Z

An attempt is made to obtain photographer information contained in the target image.

Determination of the photographer of the target image is conducted according to the photographer information obtained.

For instance, Exif information provided to the target image is obtained as the photographer information.

Here, when applying method Z, the likelihood degree calculated by the photographer likelihood degree calculating unit 63 indicates a high value (for instance, a likelihood degree of "1") since it can be assumed that the photographer information contained in the Exif information is highly reliable.

(2) Method A (Note that Hereinafter, a Photographer of the Target Image Determined According to Method A is Referred to as "Photographer A")

People appearing in images belonging to the same event cluster as the target image are extracted.

Further, extracting is performed of people appearing in images belonging to the same event cluster as the target image but not appearing in the target image.

Finally, all of the people having been extracted as described in the above are specified as the photographer of the target image (note that there may be cases where more than one person is specified as the photographer of the target image when applying method A).

(3) Method B (Note that Hereinafter, a Photographer of the Target Image Determined According to Method B is Referred to Hereinafter as "Photographer B")

People appearing in images other than the images belonging to the same event cluster as the target image are extracted.

A photographer determination degree is calculated for each of the people extracted as described in the above.

The person having the greatest photographer determination degree is specified as the photographer of the target image (note that only one photographer is specified as the photographer of the target image in all cases when applying method B).

Subsequently, the graph generating unit 70 generates a graph including image nodes, photo-subject nodes, a photographer node, a dummy node, and links set between such nodes. The graph so generated is stored to the graph storing unit 45. Since each of the links set between the nodes have an orientation, the nodes and the links therebetween constitute a directed graph.

The image and photo-subject node generating unit 71 generates image nodes and photo-subject nodes. Similarly, the photographer node generating unit (main subject person setting unit) 72 generates a photographer node, and the dummy node generating unit 73 generates a dummy node.

Among such nodes, the photographer node is a node corresponding to the main subject person, who is the evaluation subject (evaluation basis) of the evaluation performed with respect to a target image. Here, it should be noted that the evaluation of images is to be conducted while taking into account the fact that a same image is provided with a different evaluation when the evaluation subject changes. For instance, it can be assumed that person A would evaluate, as an image of high importance, an image in which person A himself/herself appears (or else, an image in which someone who he/she is familiar with appears), or an image which has been photographed by him/her. In the present embodiment, an image is provided with an evaluation that is appropriate from the viewpoint of the main subject person, by making use of the photographer node, which corresponds to the main subject person.

In addition, the dummy node is provided as a node for adjusting the weights of the links set between nodes. For instance, by providing the dummy node, the problem of "rank sink", where importance degrees are accumulated by nodes and never distributed due to there being no outward-directed links, can be resolved.

The photo-subject link setting unit 74 sets links between the photo-subject nodes and the image nodes.

The photographer link setting unit 75 sets links between the photographer node and image nodes and links between the photographer node and the photo-subject nodes.

Further, the dummy link setting unit 76 sets links such as links between the dummy node and the image nodes, and links between the dummy node and the photo-subject nodes.

The evaluating unit 80 calculates an importance degree for each of the images and each of the objects appearing in the images, and includes the adjacency matrix generating unit 81, the eigenvector calculating unit 82, and the importance degree calculating unit 83.

The adjacency matrix generating unit 81 generates an adjacency matrix representing the graph stored in the graph storing unit 45.

The eigenvector calculating unit 82 calculates an eigenvector of the adjacency matrix so generated.

The importance degree calculating unit 83 calculates an object importance degree for each of the objects and an image evaluation value for each of the images according to the components of the eigenvector so calculated. Further, the importance degree calculating unit 83 stores the object importance degrees so calculated to the object importance degree storing unit 46, and stores the image evaluation values so calculated to the image evaluation value storing unit 47.

Here, it should be noted that the object extracting unit 20, the event extracting unit 30, the object appearance characteristic value calculating unit 50, the photographer extracting unit 60, the graph generating unit 70, the evaluating unit 80 and the like may be composed of, for instance, a control program stored on a ROM (Read Only Memory), or a CPU (Central Processing Unit) capable of executing such a control program.

The display control unit 90 controls the screen displayed on the display 4. The display control unit 90 is composed of, for instance, a display controller, and displays the image evaluation values stored in the image evaluation value storing unit 47 on the screen of the display 4.

<Operation>

Explanation is provided in the following on the flow of processing performed up to the point where the images are actually evaluated.

Figure 2:
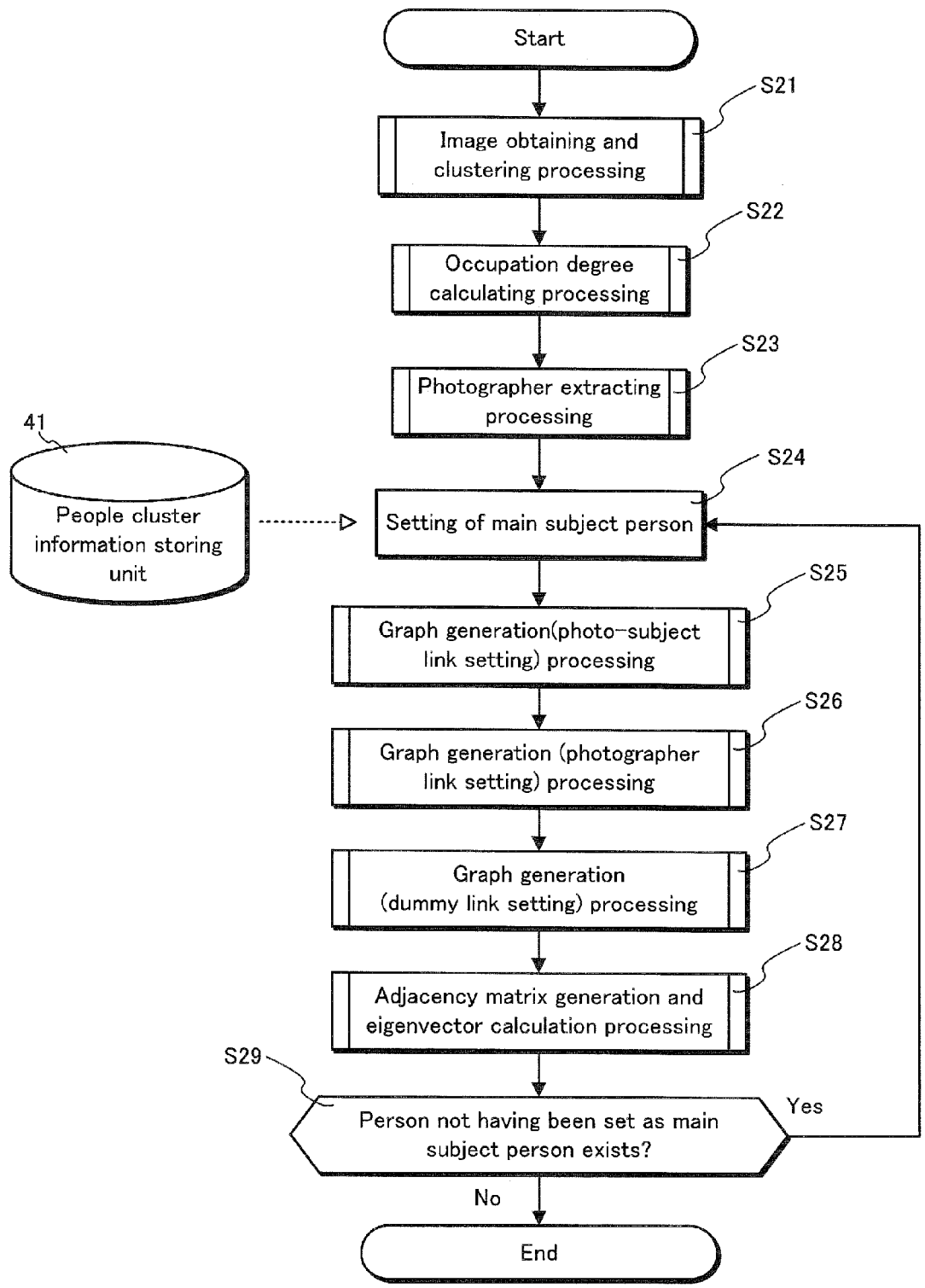
FIG. 2 is a flowchart illustrating an overview of image evaluation processing.

FIG. 2 is a flowchart illustrating an overview of image evaluation processing.

As illustrated in FIG. 2, the image evaluation device 3 conducts processing where (i) image obtaining and clustering processing (S21) by the object extracting unit 20 and the event extracting unit 30, (ii) occupation degree calculating processing (S22) by the occupation degree calculating unit 51, and (iii) photographer extracting processing (S23) by the photographer extracting unit 60 are performed in the stated order.

Subsequently, the photographer node generating unit 72 sets one of the object clusters, each of which corresponding to a person, included in the people cluster information obtained from the people cluster information storing unit 41 as the main subject person (S24).

Following this, the graph generating unit 70 performs graph generation (photo-subject ling setting) processing (S25), graph generation (photographer link setting) processing (S26), graph generation (dummy link setting) processing (S27), and adjacency matrix generation and eigenvector calculation processing (S28).

When all of the people included in the people cluster information have not yet been set as the main subject person at this point (S29: NO), the image evaluation device 3 returns to Step S24, and executes the processing in Steps S25-S28 repeatedly until all of the people included in the people cluster information have been set as the main subject person.

When all of the people included in the people cluster information have been set as the main subject person (S29: YES), the image evaluation by the image evaluation device 3 is terminated, determining that image evaluation has been performed and image evaluation values have been calculated by setting all of the people included in the people cluster information as the main subject person of the evaluation.

Figure 3:
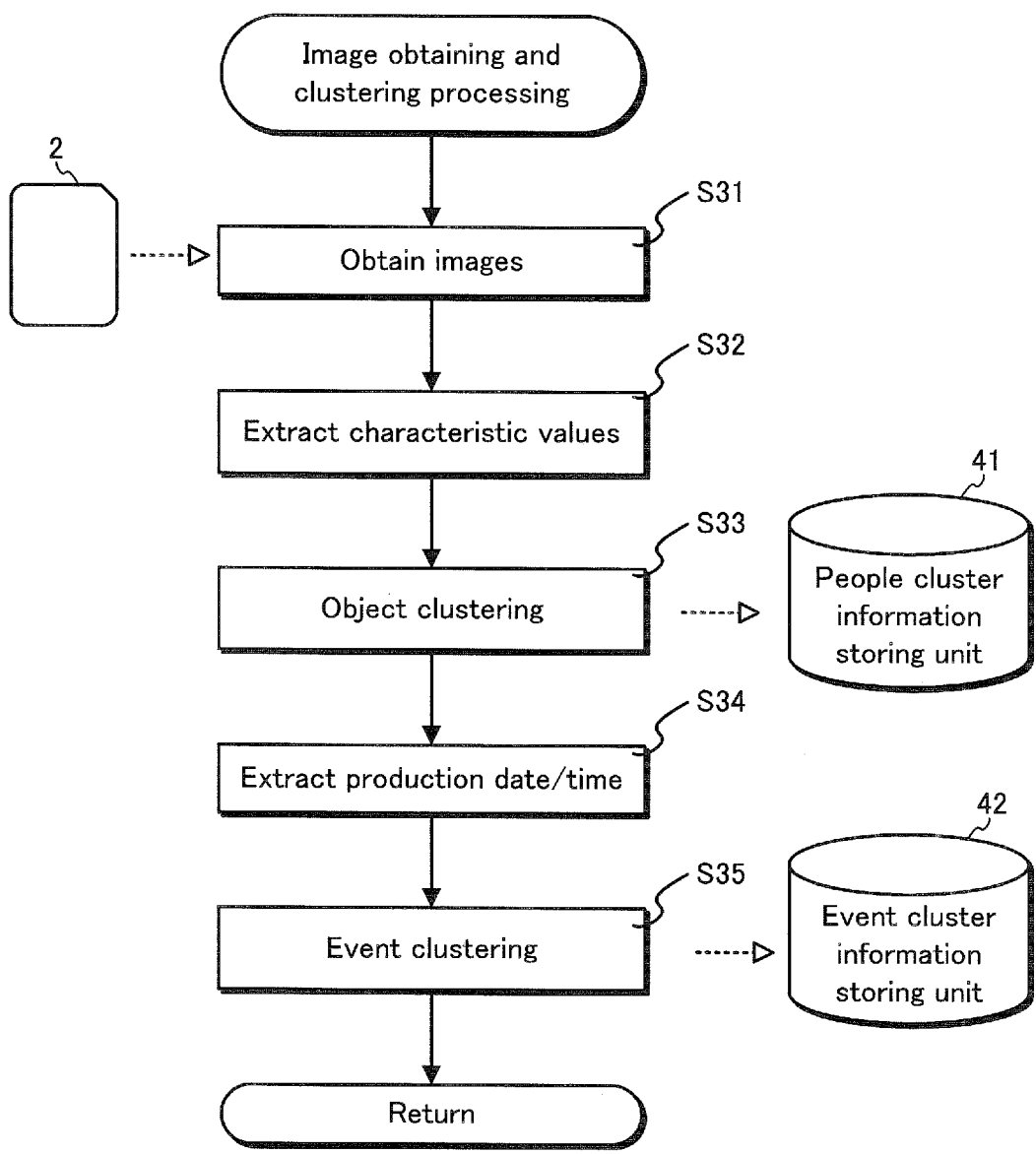
FIG. 3 is a flowchart illustrating image obtaining and clustering processing.

As illustrated in FIG. 3, the image obtaining unit 10 obtains image data stored in the SD memory card 2 from the SD memory card 2 in the image obtaining and clustering processing (S31).

The object characteristic value extracting unit 21 cuts out, from the images corresponding to the image data, areas of the images corresponding to human faces. Further, the object characteristic value extracting unit 12 extracts, as the object characteristic value, a characteristic value from each of the faces (S32).

Then, the object clustering unit 22 performs clustering with respect to the object characteristic values so extracted, and stores people cluster information indicating the result of the clustering to the people cluster information storing unit 41 (S33).

Following this, the production date/time extracting unit 31 extracts a production date/time for each of the images from the Exif information provided to each of the images (S34).

Subsequently, the event clustering unit 32 performs clustering according to the production date/times so extracted, and stores event cluster information indicating the result of the event clustering to the event cluster information storing unit 42 (S35).

In the following, explanation is provided of a specific example of Steps S32 and S33 with reference to FIG. 4. The object characteristic value extracting unit 21 cuts out four faces F1-F4 from three images A-C (portion (a) of FIG. 4). Further, the object characteristic value extracting unit 21 calculates a characteristic value for each of faces F1-F4 (portion (b) of FIG. 4).

Following this, the object clustering unit 22 performs clustering with respect to the four faces F1-F4 such that faces F2 and F3 which are similar to each other in appearance are classified into a same cluster person a, whereas faces F1 and F4 which are also similar in appearance are classified into a same cluster person b (portion (c) of FIG. 4).

Figure 5:
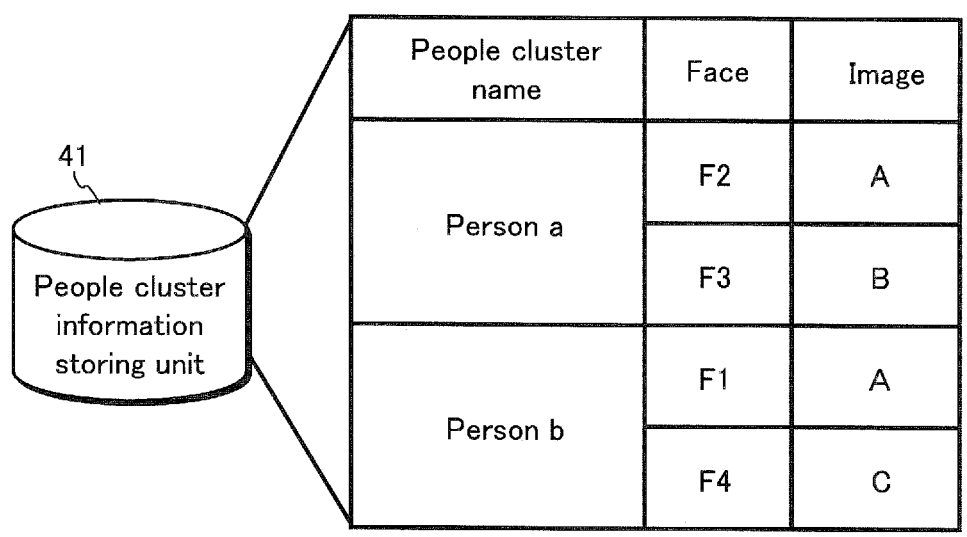
FIG. 5 illustrates contents stored in a people cluster information storing unit 41.

FIG. 5 illustrates a data structure of the people cluster information indicating results of the object clustering.

The people cluster information indicates people clusters to which each of the faces appearing in the images belong, and includes the items: "people cluster name"; "face"; and "image".

In the following, explanation is provided of a specific example of Steps S34 and S35 with reference to FIG. 6. The production date/time extracting unit 31 extracts, from each of the four images A-D (portion (a) of FIG. 6), a production date/time (portion (b) of FIG. 6).

Figure 6:
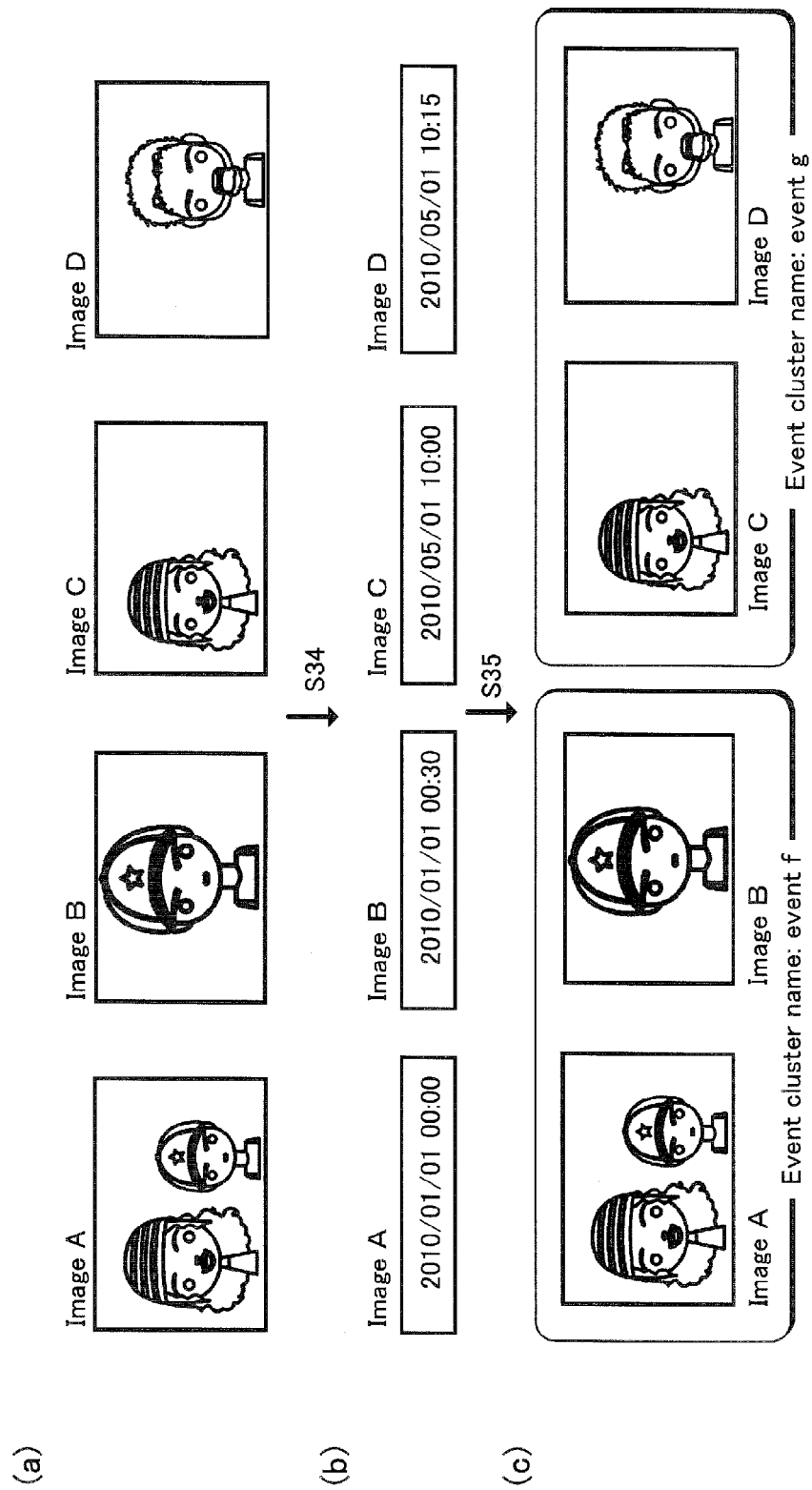
FIG. 6 illustrates a flow of event clustering processing.

Following this, the event clustering unit 32 performs clustering such that images A and B having relatively close production date/times are classified into a same event cluster f, whereas images C and D similarly having relatively close production date/times are classified into a same event cluster g (portion (c) of FIG. 6).

Figure 7:
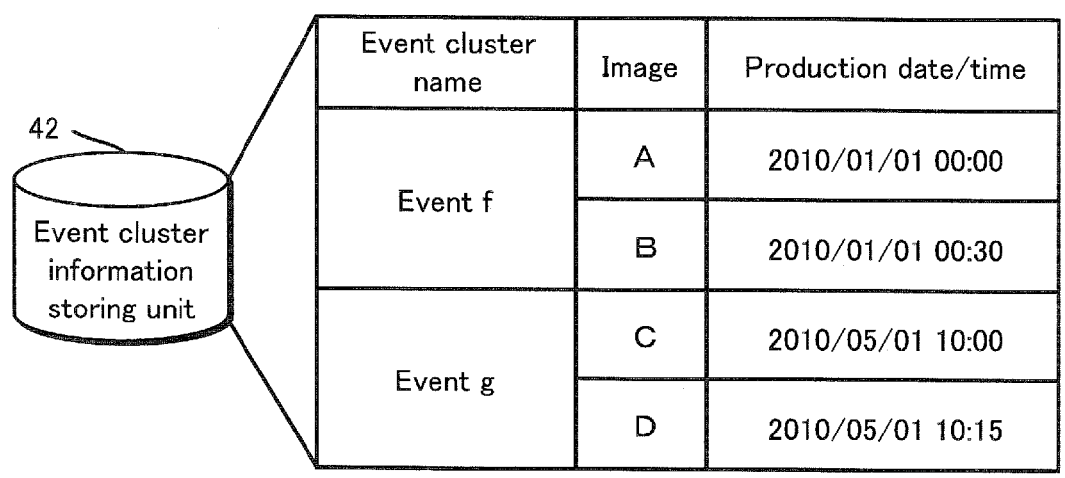
FIG. 7 illustrates contents stored in an event cluster information storing unit 42.

FIG. 7 illustrates a data structure of the event cluster information indicating results of the event clustering. The event cluster information indicates event clusters that each of the images belongs to, and includes the items: "event cluster name"; "image"; and "production date/time".

Figure 8:
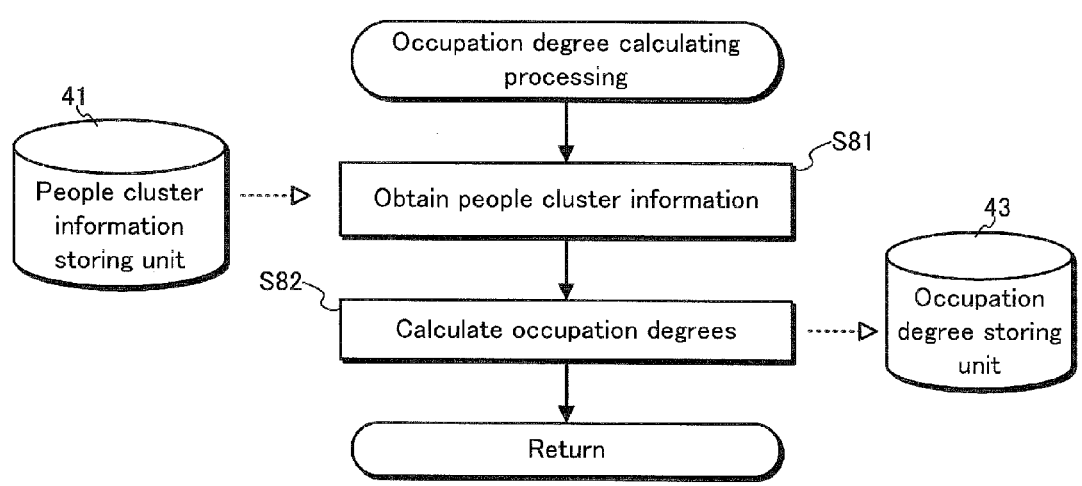
FIG. 8 is a flowchart illustrating occupation degree calculating processing.

Subsequently, explanation is provided of the occupation degree calculating processing (FIG. 2: S22) with reference to FIG. 8.

The occupation degree calculating unit 51 obtains the people cluster information from the people cluster information storing unit 41 (S81).

The occupation degree calculating unit 51 calculates, for each of the objects appearing in the images, a proportion (occupation degree) that an, object occupies in a corresponding image according to the people cluster information so obtained. More specifically, in order as to calculate an occupation degree of an object in an image, the occupation degree calculating unit 51 divides the surface area of the image occupied by the object by the total surface area of the image in which the object appears. As is already mentioned in the above, objects are extracted from the images by the object characteristic value extracting unit 50. Further, the occupation degree calculating unit 51 calculates the occupation degree of the background (non-object area) in the image by subtracting the occupation degree of the object from "1". Finally, the occupation degree calculating unit 51 stores the object occupation degrees and the background occupation degrees calculated as described in the above to the occupation degree storing unit 43 (S82).

In the following, description is provided on a specific example of Step S82 with reference to FIGS. 9A-9C.

As illustrated in FIGS. 9A-9C, image B includes the object face F3.

The occupation degree calculating unit 51 calculates the surface area $S_2$ corresponding to the area occupied by face F3, as well as the entire surface area $S_1$ of image B in which face F3 appears. According to the values $S_1$ and $S_2$ calculated as such, the occupation degree calculating unit 51 calculates the occupation degree of the object face F3 in image B by conducting $S_2/S_1$.

For instance, when surface area $S_2$ occupied by face F3 corresponds to 500,000 pixels and the total surface area of image B corresponds to 1,000,000 pixels, the occupation degree of face F3 in image B is calculated as 50/100=0.5. Accordingly, the occupation degree of the background in image B is calculated as 0.5 through the calculation of 1−0.5=0.5.

Figure 10:
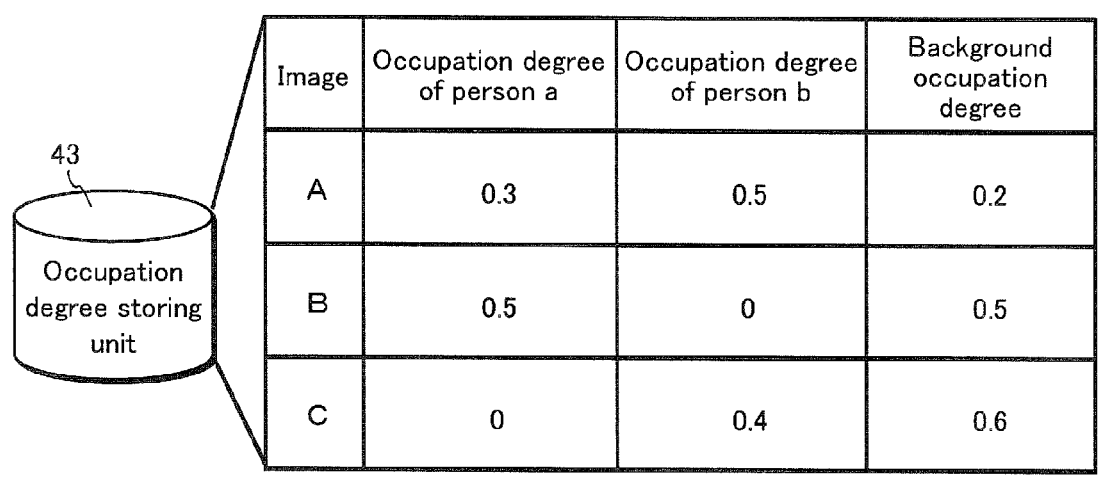
FIG. 10 illustrates contents stored in an occupation degree storing unit 43.

FIG. 10 illustrates a data structure of the photo-subject information indicating results of the occupation degree calculation. The photo-subject information includes the items: "image"; "occupation degree of person a"; "occupation degree of person b"; and "occupation degree of background".

Next, detailed description is provided on the photographer extracting processing (FIG. 2: S23) with reference to FIG. 11.

First, the photographer extracting unit 60 obtains the people cluster information from the people cluster information storing unit 41 (S111).

The following Step S112 corresponds to the above-described method Z, which is one of the methods for determining the photographer of the target image.

The photographer obtaining unit 61 attempts to obtain photographer information included in the Exif information provided to the target image (S112). When the photographer information is successfully obtained, the photographer obtaining unit 61 specifies the name of the people cluster corresponding to the photographer specified in the photographer information by referring to the people cluster information having been obtained in Step S111.

Note that, in Step S112, the determination of the photographer of the target image may be made on the basis of information set through user operations. That is, the user may be prompted to make such user operations by, for instance, displaying a menu prompting the user to determine the photographer of the target image.

When the photographer of the target image is successfully determined, the processing proceeds to Step S117 (S113: YES).

When the photographer of the target image cannot be determined through the above-described processing (S113: NO), the photographer determining unit 62 obtains the people cluster information from the people cluster information storing unit 41 and the event cluster information from the event cluster information storing unit 42, and prepares for the following processing (S114).

Following this, the photographer determining unit 62 determines a person who can be assumed to be the photographer having photographed the image according to the people cluster information and the event cluster information so obtained (S115). Note that, in Step S115, the above-described methods A and B are executed in the stated order.

Subsequently, the photographer likelihood degree calculating unit 63 calculates a photographer likelihood of the person having been specified as the photographer of the image according to the people cluster information and the event cluster information obtained (S116). Further, the photographer likelihood degree calculating unit 63 stores the photographer having been determined in Step S115 and the photographer likelihood degree of the photographer calculated through the above-described processing to the photographer likelihood degree storing unit 44 (S117).

Note that, when the result of the judgment in Step S113 is "YES", the photographer likelihood degree calculating unit 63 similarly calculates a photographer likelihood degree for the photographer specified in the information obtained by the photographer obtaining unit 61, and stores information indicating the photographer and the photographer likelihood degree so calculated to the photographer likelihood degree storing unit 44 in association (S117).

In the following, explanation is provided of photographer determining processing (FIG. 11: S115) with reference to FIG. 12.

The photographer determining unit 62 first determines photographer A (S121), and then determines photographer B (S122). Such determination of the photographer of the target image is performed according to the people cluster information and the event cluster information obtained in Step S114.

Here, it should be noted that the determination of photographer B (S122) is only performed for certain images, for which photographer A cannot be determined even when the determination of photographer A (S121) has been attempted. That is, images whose photographer A has been determined as a result of the determination of photographer A (S121) is excluded from the images to which the determination of photographer B is performed according to method B.

Figure 13:
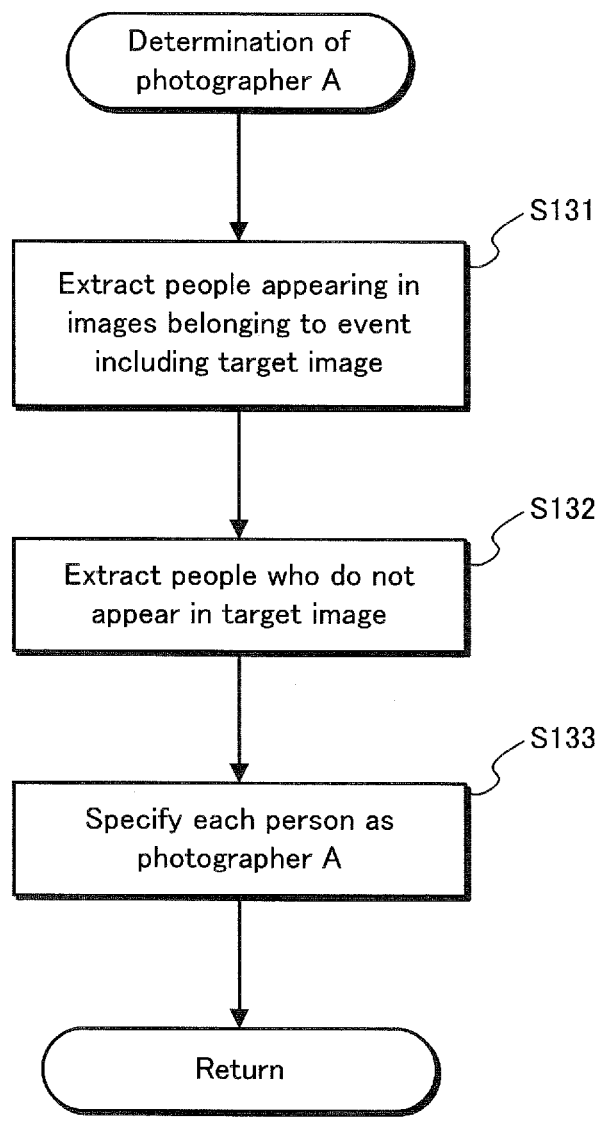
FIG. 13 is a flowchart illustrating photographer determining processing for determining photographer A.

In the following, detailed explanation is provided of the method for determining photographer A with reference to FIG. 13. The photographer determining unit 62 extracts people appearing in images belonging to the same event cluster as the image whose photographer is to be determined (referred to hereinafter as the "target image") according to the event cluster information and the people cluster information obtained (S131). Subsequently, the photographer determining unit 62 further extracts, from among the people so extracted, people who do not appear in the target image (S132), and specifies each of such people as photographer A (S133).

In the following, description is provided on an example of determining photographer A with reference to FIGS. 14A-14C.

Figure 14A:
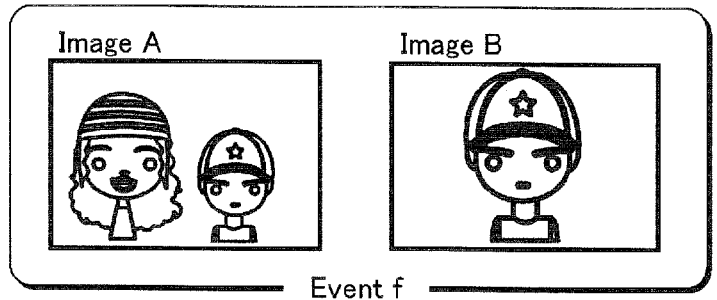
FIGS. 14A, 14B, and 14C illustrate a flow of the photographer determining processing for determining photographer A.
Figure 14B:
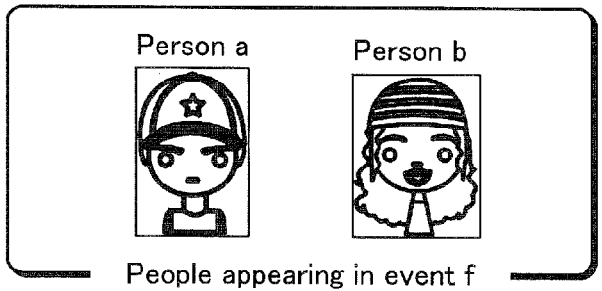

The photographer determining unit 62 extracts person a and person b appearing in the two images A and B belonging to event cluster f (FIG. 14A, FIG. 14B).

Since a person fulfilling the two conditions of: (i) appearing in the images belonging to event cluster f and (ii) not appearing in the image A does not exist for image A, photographer A for image A does not exist.

Figure 14C:
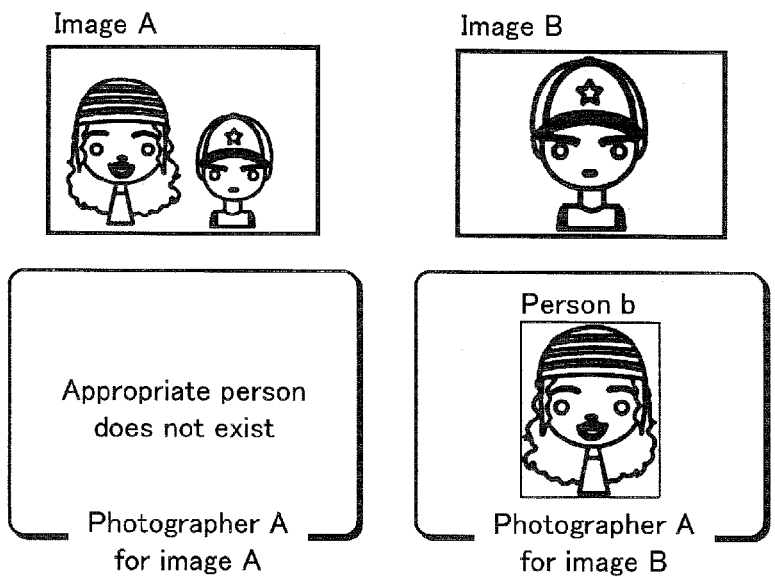

On the other hand, person b not appearing in image B is specified as photographer A for image B (FIG. 14C).

Figure 15:
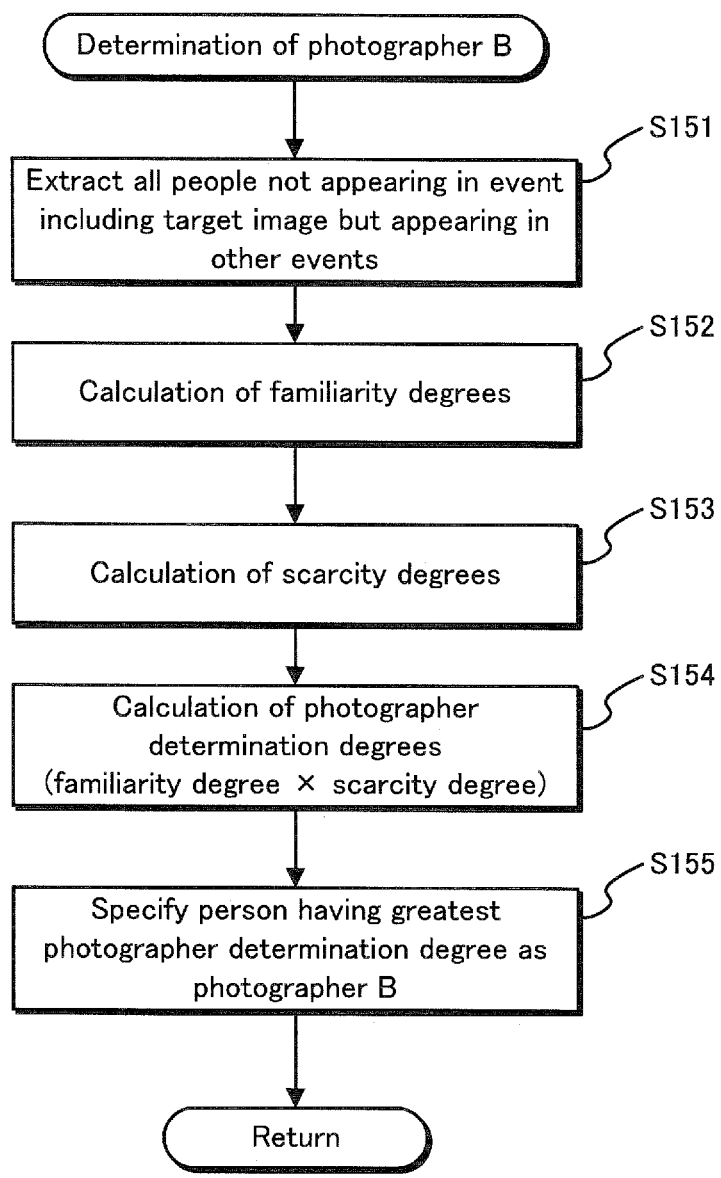
FIG. 15 is a flowchart illustrating photographer determining processing for determining photographer B.

In the following, explanation is provided on the method for determining photographer B with reference to FIG. 15. The photographer determining unit 62 extracts all of the people appearing in the images that fulfill the following conditions of: (i) not appearing in images belonging to the same event cluster as the target image and (ii) appearing in images belonging to event clusters other than the event cluster that the target image belongs to (S151). Note that here, the extraction is performed according to the event cluster information and the people cluster information obtained.

Subsequently, the photographer determining unit 62 calculates a familiarity degree for each of the people having been extracted as described in the above. The familiarity degree indicates the familiarity between a person so extracted and the people appearing in the images belonging to the event cluster of the target image (S152).

Following the calculation of familiarity degrees, the photographer determining unit 62 calculates a scarcity degree (S153) for each of the people having been extracted as described in the above.

Following this, the photographer determining unit 62 multiplies the familiarity degree and the scarcity degree so calculated to obtain a photographer determination degree for each of the people not appearing in the event cluster including the target image (S144).

Finally, the photographer determining unit 62 specifies a person having the greatest photographer determination degree, among the photographer determination, degrees so calculated, as photographer B of the target image (S155).

In the following, description is provided on the familiarity degree calculating processing in Step S152 and the scarcity degree calculating processing in Step S153 in the stated order.

(1) Calculation of Familiarity Degrees (S152)

Here, a "familiarity degree" indicates the familiarity between a person appearing in the target image and a person not appearing in the target image (a person who is one of the candidates of photographer B).

More specifically, the familiarity degree between the two people as described above is calculated by multiplying (i) the number of event clusters in which the two people appear together and (ii) the number of images in which the two people appear together as photo-subjects.

In the following, explanation is provided of the specific calculation performed for calculating the familiarity degree.

For instance, let event cluster f be an event cluster that includes target image A, in which person a and person b appear together.

Here, calculation is performed of a familiarity degree between person c, who does not appear in event cluster f, and the people appearing in target image A, namely person a and person b. The familiarity degree in this case is expressed as Familiarity (A, c). In specific, Familiarity (A, c) is calculated by multiplying EventCo (c, a) and PhotoCo (c, a) and multiplying EventCo (c, b) and PhotoCo (c, b), and further by adding the results of the multiplication. Here, EventCo (c, a) and EventCo (c, b) respectively indicate (i) a number of event clusters other than event cluster f in which person c and person a appear together, and (ii) a number of event clusters other than event cluster f in which person c and person b appear together. In addition, PhotoCo (c, a) and PhotoCo (c, b) respectively indicate (i) a number of images in which person c and person a appear together, and (ii) a number of images in which person c and person b appear together.

Such calculation as described in the above is represented by (Equation 1) as provided in the following.

[Math 1]

$$\text{Familiarity}(A,c) = (\text{PhotoCo}(c,a)+1) \times ((\text{EventCo}(c,a)+1) + (\text{PhotoCo}(c,b)+1) \times (\text{EventCo}(c,b)+1)) \quad \text{(Equation 1)}$$

(2) Calculation of Scarcity Degrees (S153)

Here, a "scarcity degree" indicates how infrequently a person not appearing in the event cluster of the target image appears in images included in the other event clusters.

In the following, explanation is provided of the method for calculating the scarcity degree. Note that in the following explanation, a person not appearing in the target image, for whom a scarcity degree is calculated, is referred to as a "target person".

For instance, let N be the entire number of images included in an event cluster that the target person appears in, and let N(m) be the number of images belonging to the event cluster that the target person actually appears in.

The scarcity degree can be calculated by dividing N by N(m), and further by adding up each of the results for each of the event clusters the target person appears in.

Such calculation as described in the above is represented by (Equation 2) as provided in the following.

[Math 2]

$$\text{Scarcity} = \sum \frac{N}{N(m)} \quad \text{(Equation 2)}$$

N: entire number of images in an event cluster that the target person appears in N(m): number of images that the target person actually appears in, among the entire number of images in the event cluster, The calculation method of the scarcity degree as described in the above is based on the conception that the likelihood of a given person having photographed the target image increases when the person appears in a large number of event clusters but appears only in a small number of images in each of the event clusters.

In the following, specific description is provided on the flow of processing for determining photographer B with reference to FIGS. 16A-16D.

Figure 16A:
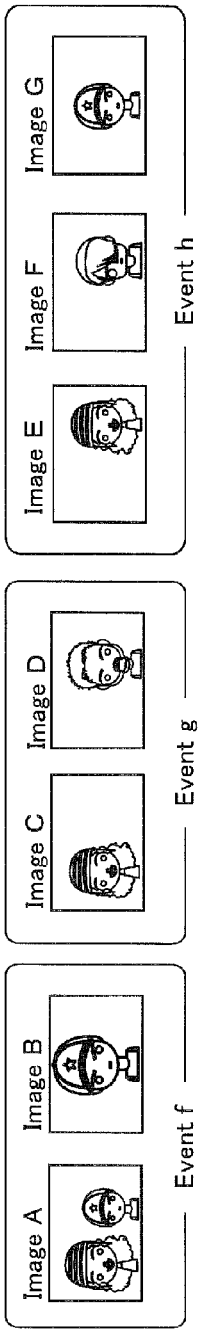

Description in the following is provided presuming that there are seven images, namely images A-G, each of which being clustered into one of event clusters f, g, and h (FIG. 16A).

Figure 16B:
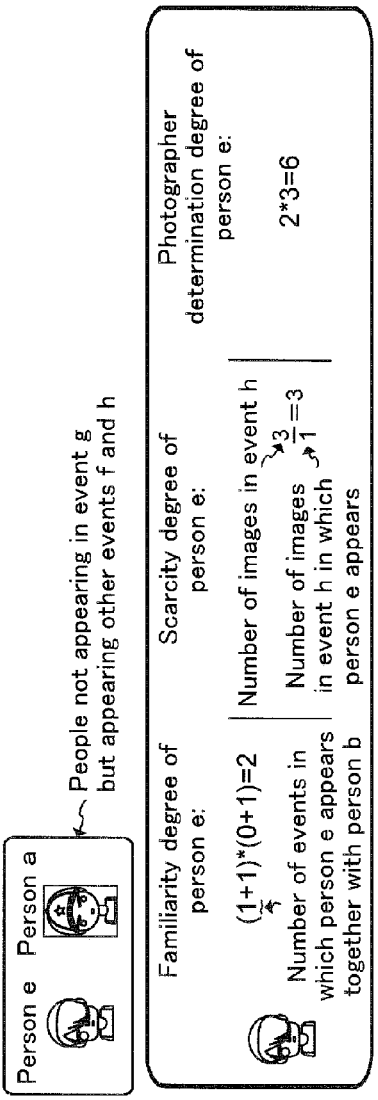

In such a case, when the target image whose photographer is to be determined according to method B is image C, the photographer determining unit 62 extracts people fulfilling the following conditions of (i) not appearing in event cluster g that the target image C belongs to, and (ii) appearing in event clusters other than the event cluster g, that is, event clusters f and h in this case (FIG. 16B). Accordingly, the photographer determining unit 62 extracts person e and person a.

A familiarity degree between person b appearing in the target image and each of persons e and a is calculated as provided in the following with reference to FIG. 16C.

First, the familiarity degree between person e and person b is calculated as follows.

The number of event clusters in which person e appears together with person b is "1" (EventCo (b, e)=1). In this case, person e and person b appear together in event cluster h.

The number of images in which person e appears together with person b is "0" (PhotoCo (b, e)=0).

Accordingly, the familiarity degree between person e and person b is calculated as (1+1)*(0+1)=2.

Similarly, the familiarity degree between person a and person b is calculated as follows.

The number of event clusters in which person a appears together with person b is "2" (EventCo (b, a))=2). In this case, person a and person b appear together in event clusters f and h.

The number of images in which person a appears together with person b is "1" (PhotoCo (b, a)=1).

Accordingly, the familiarity degree between person a and person b is calculated as (2+1)*(1+1)=6.

Further, the scarcity degree for each of person e and person a is calculated as provided in the following. First, the scarcity degree of person e is calculated as follows.

Event cluster h including image F, in which person e appears, includes a total of "3" images, and the number of images in which person e appears, among the images included in event cluster h, is "1". In this case, person e appears in image F among the images included in event cluster h.

Accordingly, the scarcity degree for person e is calculated as 3/1=3.

Further, the scarcity degree of person a is calculated as follows.

Event cluster f including image B, in which person a appears, includes a total of "2" images, and the number of images in which person a appears, among the images included in event cluster f, is "1". In this case, person a appears in image B among the images included in event cluster f.

Event cluster h including image G, in which person a appears, includes a total of "3" images, and the number of images in which person a appears, among the images included in event cluster h, is "1". In this case, person a appears in image G among the images included in event cluster h.

Accordingly, the scarcity degree for person a is calculated as 2/2+3/1=4.

Figure 16D:
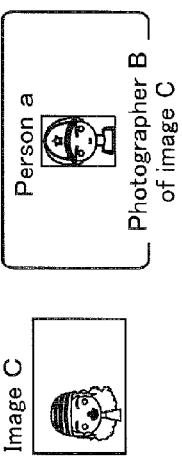

Therefore, the photographer determination degree for person e is calculated as "6", which is obtained by multiplying the familiarity degree "2" and the scarcity degree "3", whereas the photographer determination degree for person a is calculated as "24", which is obtained by multiplying the familiarity degree "6" and the scarcity degree "4". As a result, the photographer determining unit 62 specifies person a having the greatest photographer determination degree as photographer B (FIG. 16D).

Figure 11:
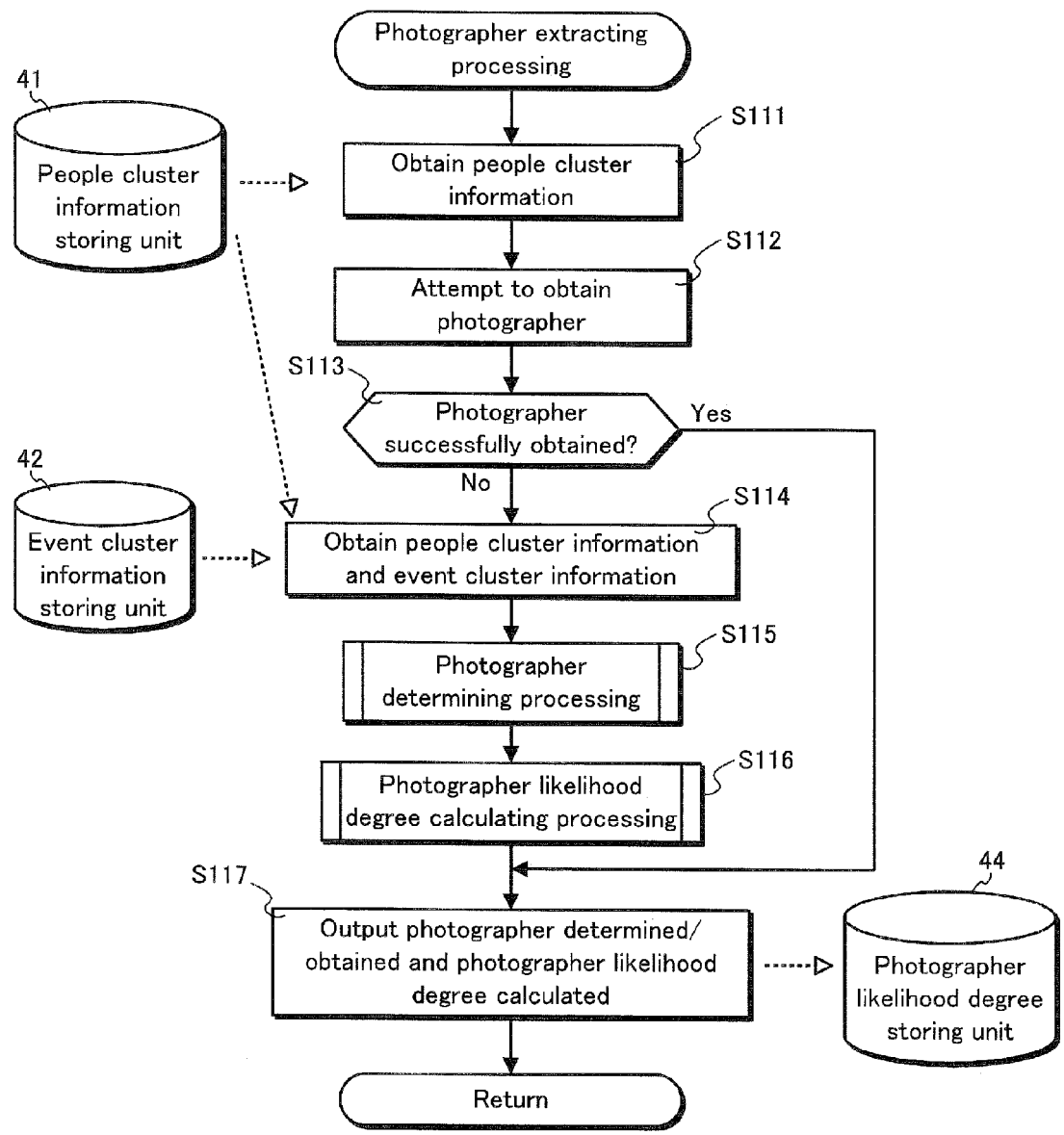
FIG. 11 is a flowchart illustrating photographer extracting processing.

When the photographer determining processing (FIG. 11: S115) is completed, processing proceeds to photographer likelihood degree calculating processing (S116).

Figure 17:
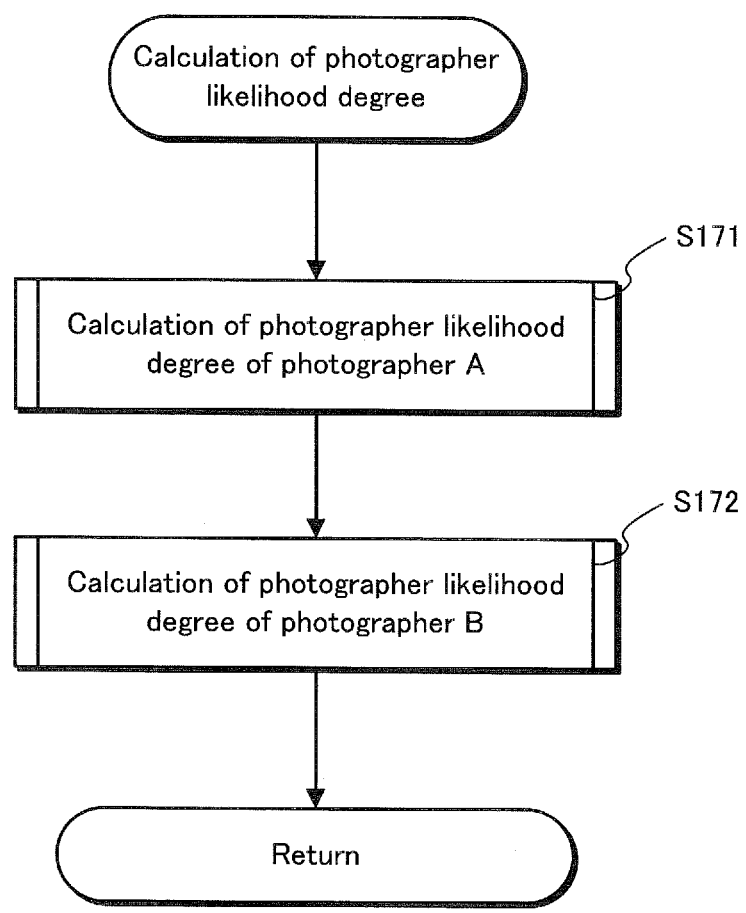
FIG. 17 is a flowchart illustrating an overview of photographer likelihood degree calculating processing.

FIG. 17 illustrates the details of the photographer likelihood degree calculating processing.

As illustrated in FIG. 17, the photographer likelihood degree calculating unit 63 performs calculation of a photographer likelihood degree of photographer A (S171) and calculation of a photographer likelihood degree of photographer B (S172) in the stated order.

Figure 18:
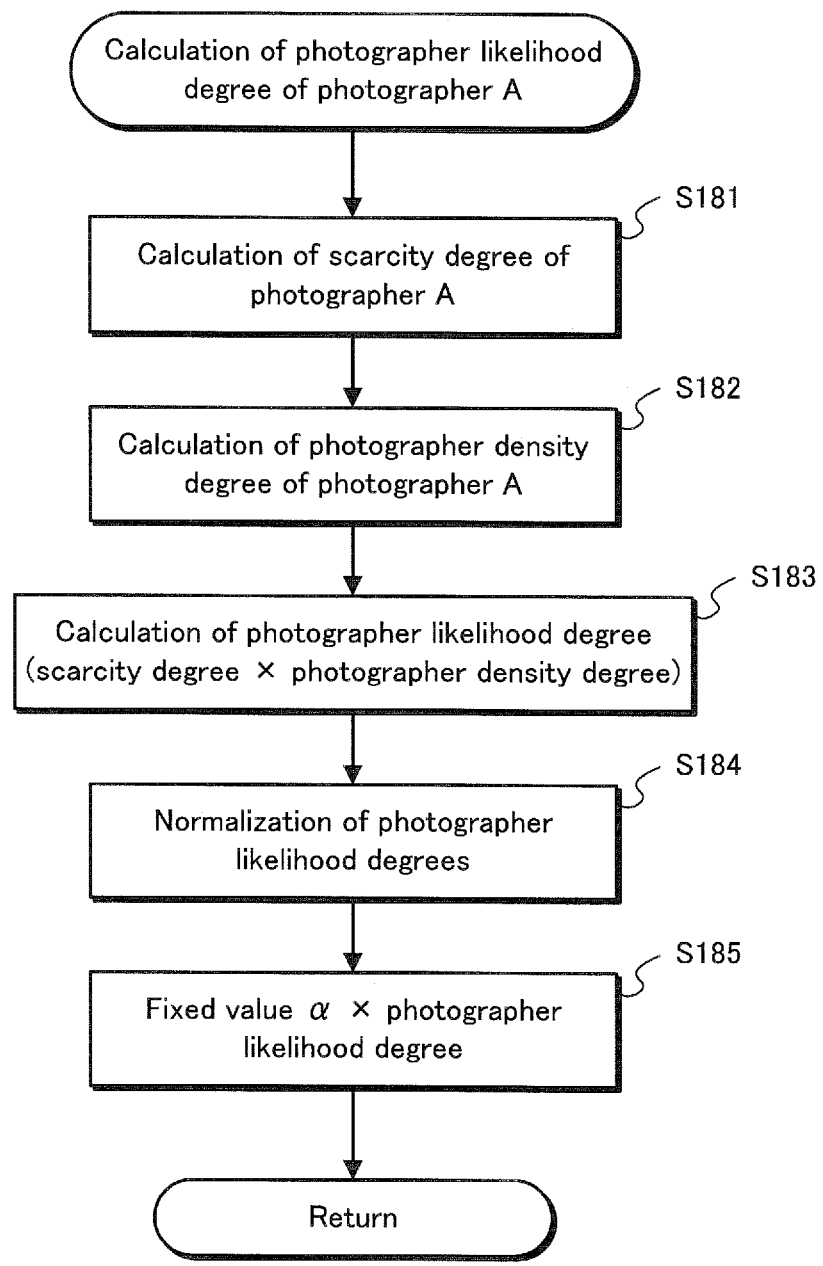
FIG. 18 is a flowchart illustrating photographer likelihood degree calculating processing performed with respect to photographer A.

First, explanation is provided of the calculation of the photographer likelihood degree of photographer A (FIG. 17: S171) with reference to FIG. 18.

First, the photographer likelihood degree calculating unit 63 calculates a scarcity degree for photographer A determined in the above-described manner according to the people cluster information and the event cluster information obtained (S181). Since the method for calculating the scarcity degree is similar to the above-described method for calculating the scarcity degree in the case of photographer B, description thereof is omitted.

Following the calculation of the scarcity degree, the photographer likelihood degree calculating unit 63 calculates a photographer density degree for photographer A (S182).

Here, a "photographer density degree" is a value indicating a frequency at which the person having been specified as photographer A of the target image is similarly specified as photographer A for images arranged close to the target image.

Such a configuration is made since, in the typical usage of digital still cameras, there is a tendency that a same photographer photographs multiple images continuously. Thus, an assumption is made that there is a greater likelihood of a person having a greater photographer density degree than others having photographed the target image.

In the following, explanation is provided of the calculation method of the photographer density degree with reference to FIGS. 19A and 19B.

Figures 19A, 19B:
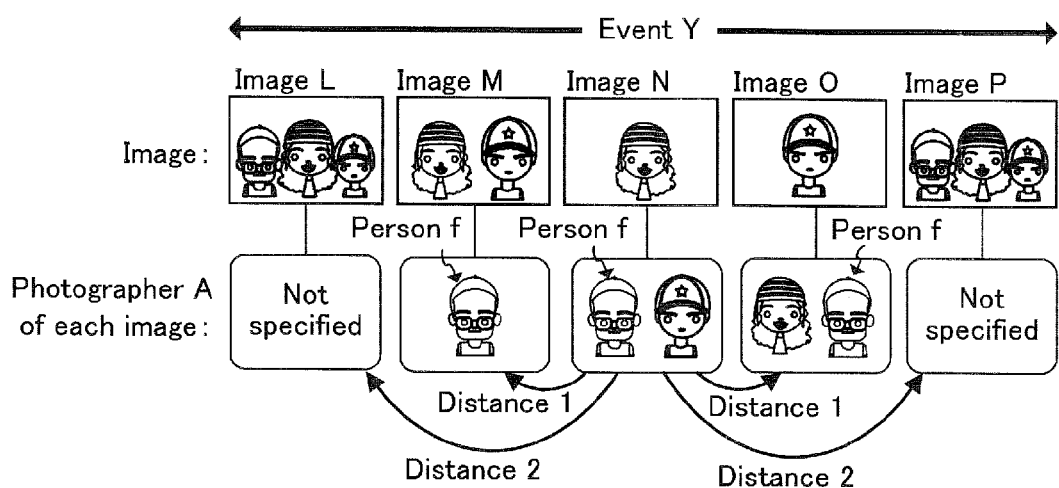
FIGS. 19A and 19B illustrate a flow of photographer density calculating processing.

Description in the following is provided presuming that five images, namely images L-P, are clustered into event cluster Y, and that photographer A for each of the images have been specified according to the people appearing in the images (FIG. 19A).

In this case, the photographer density degree of person f for image N is calculated according to a distance (d (N, M)) between image N and image M, and a distance (d (N, O)) between image N and image O. Note that here, person f has been specified as photographer A of images M, N, and O, and the "distance" is calculated by counting the number of images from one image to another in the order of production.

Such calculation as described in the above, when generalized, is represented by (Equation 3) as provided in the following.

[Math 3]

$$\text{Density} = \sum \frac{1}{d(i, j)} \qquad \text{(Equation 3)}$$

d: distance (number of images) calculated by counting the number of images, in the order of production, from target image i to another image j for which the same people cluster as target image i is specified as photographer A In the following, description is provided in further detail on the method for calculating the photographer density degree of person f for image N. In the case illustrated in FIG. 19B, person f has been specified as photographer A for image M and image O. Further, in this case, the distance between image N and image M is "1", whereas the distance between image N and image O is similarly "1".

Accordingly, the photographer density degree of person f for image N is calculated as 1/1+1/1=2.

Now, description will be continued returning to the flow illustrated in FIG. 18 once again.

The photographer likelihood degree calculating unit 63 multiplies the scarcity degree and the photographer density degree which have been calculated as described in the above, and thereby calculates the photographer likelihood degree for each of the people having been specified as photographer A of the target image (S183). In addition, the photographer likelihood degree calculating unit 63 performs normalization of the photographer likelihood degrees so calculated (S184).

Finally, the photographer likelihood degree calculating unit 63 multiplies a normalized photographer likelihood degree of photographer A by a fixed value $\alpha$ such that the sum of the photographer likelihood degrees of photographer A and photographer B for each of the images equals "1" (S185). Note that the photographer likelihood degrees used in the calculation are those having been obtained through the processing as described in the above.

In the following, specific description is provided on the flow of processing for calculating a photographer likelihood degree for image E, whose photographer A has been determined, with reference to FIGS. 20A-20C.

Figure 20A:
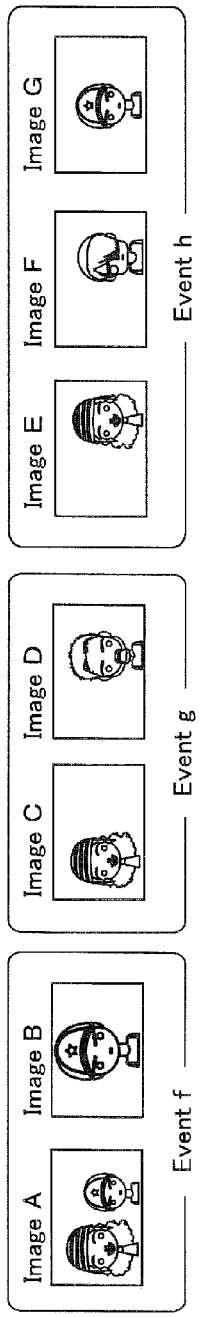
FIGS. 20A, 20B, and 20C illustrate a flow of the photographer likelihood degree calculating processing performed with respect to photographer A.

Description in the following is provided presuming that images A-G, each of which being clustered into a corresponding one of event clusters f, g, and h, exist (FIG. 20A).

The photographer determining unit 62 determines photographer A for each of images E, F, and G included in event cluster h.

The results of the determination are as follows.
Person e and person a are specified as photographer A for image E.
Person a and person b are specified as photographer A for image F.
Person b and person e are specified as photographer A for image G.

Figure 20B:
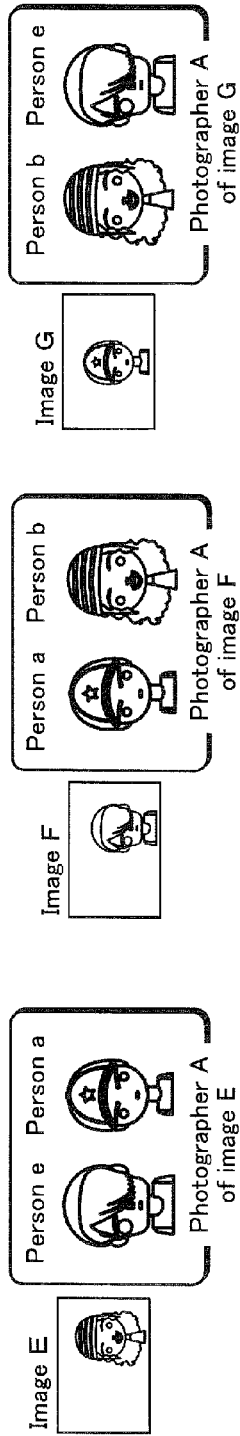
Figure 20C:
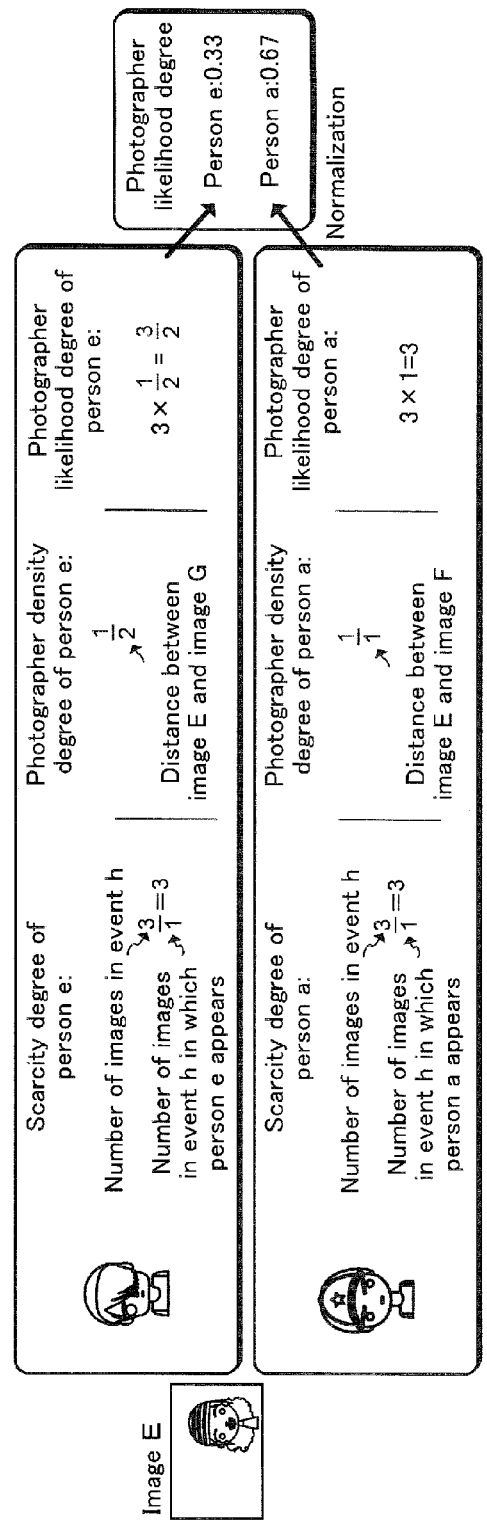

Note that the results of the determination are illustrated in FIG. 20B.

Subsequently, the photographer likelihood degree calculating unit 63 calculates a photographer likelihood degree for each of person e and person a, who have been specified as photographer A for image E, by calculating a scarcity degree and a photographer density degree for each of person e and person a, and further, by multiplying the scarcity degree and the photographer density degree so calculated for each of person e and person a. Further, the photographer likelihood degree calculating unit 63 performs normalization of the photographer likelihood degrees so calculated (FIG. 20C).

Figure 21:
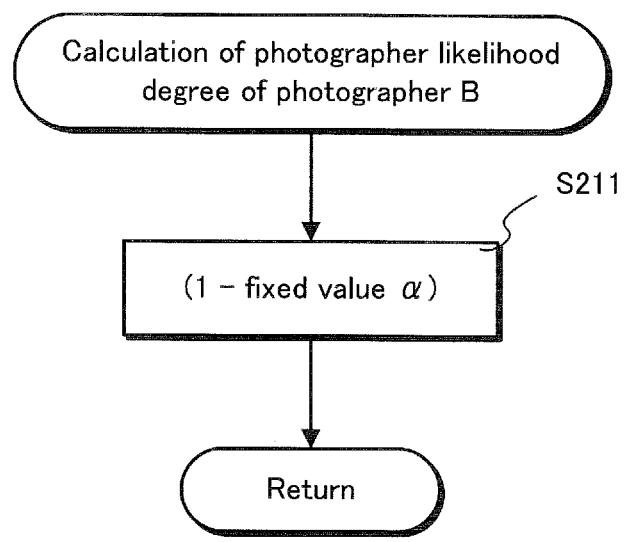
FIG. 21 is a flowchart illustrating photographer likelihood degree calculating processing performed with respect to photographer B.

Subsequently, explanation is provided of the calculation of the photographer likelihood degree for photographer B (FIG. 17: S172) with reference to FIG. 21.

The photographer likelihood degree calculating unit 63 calculates, as the photographer likelihood degree for photographer B of the target image, a value obtained by subtracting the fixed value $\alpha$ from "1" (S211).

The photographer likelihood degrees of photographer A and photographer B of the target image are calculated through the above-mentioned processing.

FIG. 22 illustrates a data structure of the photographer likelihood degree. The photographer likelihood degree includes, as data thereof, the items: "image"; "photographer likelihood degree of person a"; "photographer likelihood degree of person b"; "total photographer likelihood degree of image"; and "total photographer likelihood degree of people cluster". The value indicated in the item "total photographer likelihood degree of image" is calculated by adding up the photographer likelihood degrees of people clusters having been specified as the photographer of a corresponding image. Further, the value indicated in the item "total photographer likelihood degree of people cluster" is calculated by adding up the photographer likelihood degrees of images for which the corresponding people cluster has been specified as the photographer.

In the following, description is provided on the graph generation (photo-subject link setting) processing (FIG. 2: S25) with reference to FIG. 23.

The image and photo-subject node generating unit 71 obtains the people cluster information from the people cluster information storing unit 41 and obtains the occupation degrees from the occupation degree storing unit 43 (S231).

Subsequently, the image and photo-subject node generating unit 71 creates P image nodes corresponding to the images included in the people cluster information (the number of images being P in this case) and Q photo-subject nodes corresponding to the number of types of people clusters (the number of types of people clusters being Q in this case) for indicating the relationships between images and photo-subjects (S232). Here, the creation of such nodes is performed according to the people cluster information and the occupation degrees obtained, and further, a total number of (P+Q) nodes is created.

Following this, the photo-subject link setting unit 74 of the graph generating unit 70 sets links between the image nodes and the photo-subject nodes created as described above according to the people cluster information and the occupation degrees obtained (S233).

The rules applied when setting the links between the image nodes and the photo-subject nodes are as follows.

(1) A value of a link directed from an image node to a photo-subject node is set to a value obtained by multiplying an occupation degree in the image of a person belonging to the people cluster of the photo-subject by a given fixed value $\beta$.

(2) A value of a link directed from a photo-subject node to an image node is set to a value obtained by dividing a given fixed value $\gamma$ by the number of images that the person corresponding to the photo-subject node appears in.

Figure 24:
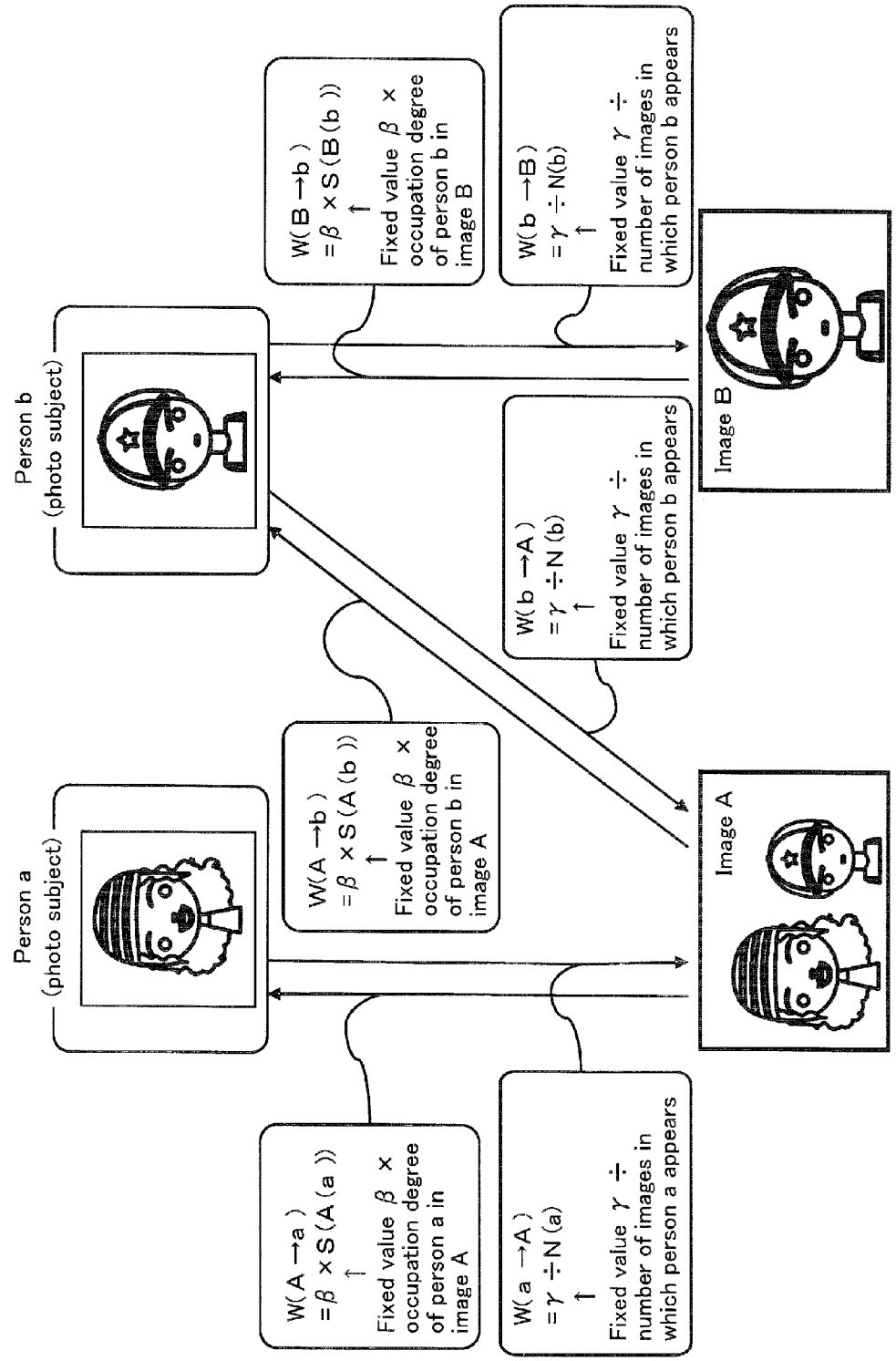
FIG. 24 illustrates link setting between image nodes and photo-subject nodes.

FIG. 24 illustrates an example of setting links between images A and B, and people a and b corresponding to photo-subject nodes.

According to the rules (1) and (2) provided in the above, the links are set as follows.

A value of a link (W (A→a)) directed from image A to person a is a value ($\beta \times S$ (A (a))) obtained by multiplying the occupation degree of person a in image A (S (A (a))) and the fixed value $\beta$.

A value of a link (W (A→b)) directed from image A to person b is a value ($\beta \times S$ (A (b))) obtained by multiplying the occupation degree of person b in image A (S (A (b))) and the fixed value $\beta$.

A value of a link (W (B→b)) directed from image B to person b is a value ($\beta \times S$ (B (b))) obtained by multiplying the occupation degree of person b in image B (S (B (B))) and the fixed value $\beta$.

Contrariwise, a value of a link (W (a→A)) directed from person a to image A is a value ($\gamma \div N$ (a)) obtained by dividing the fixed value $\gamma$ by the number of images in which the person a appears (N (a)).

Similarly, a value of a link (W (b→A)) directed from person b to image A is a value ($\gamma \div N$ (b)) obtained by dividing the fixed value $\gamma$ by the number of images in which person b appears (N (b)).

Figure 25:
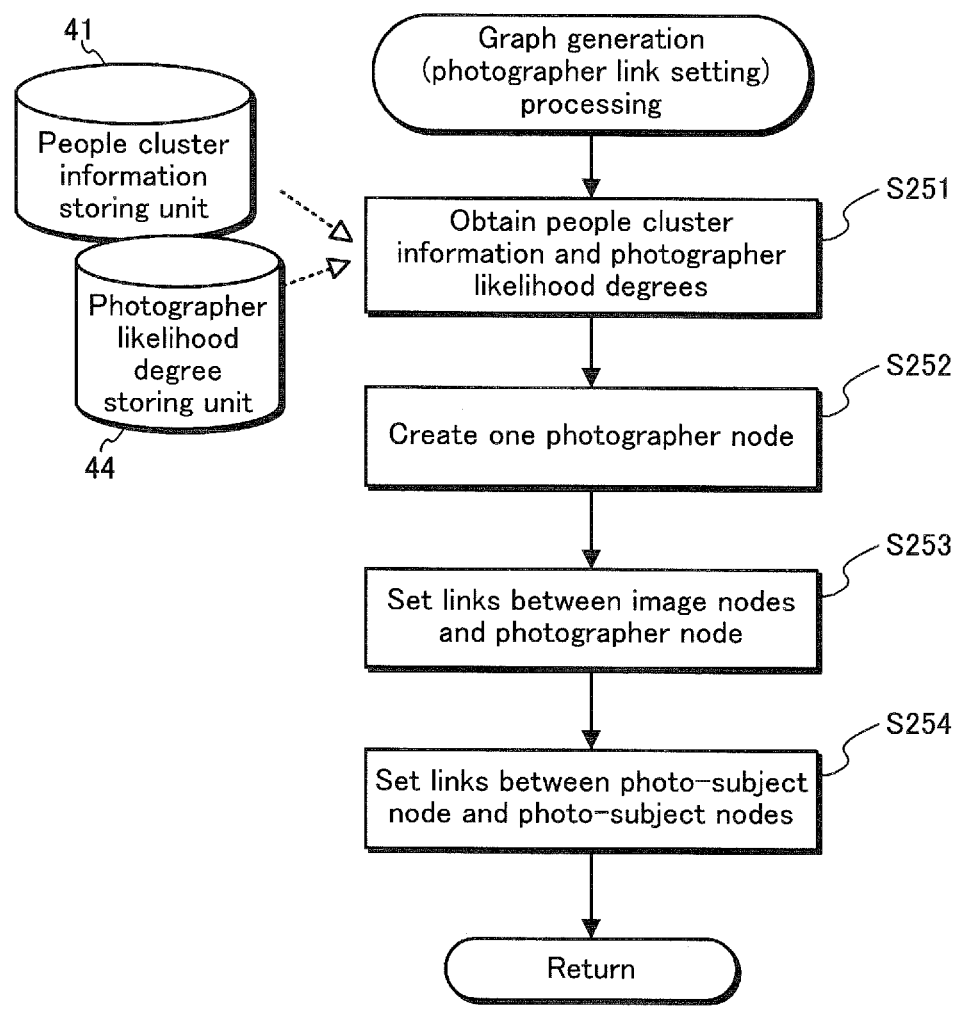
FIG. 25 is a flowchart illustrating graph generation (photographer link setting) processing.

Subsequently, description is provided on the graph generation (photographer link setting) processing (FIG. 2: S26) with reference to FIG. 25.

The photographer node generating unit 72 obtains the people cluster information from the people cluster information storing unit 41 and obtains the photographer likelihood degrees from the photographer likelihood degree storing unit 44 (S251).

Following this, the photographer node generating unit 72 of the graph generating unit 70 creates one photographer node corresponding to the main subject person set in Step S24 illustrated in FIG. 2 (S252). Here, the creation of the photographer node is performed according to the people cluster information and the photographer likelihood degrees obtained.

Subsequently, the photographer link setting unit 75 of the graph generating unit 70 sets links between the photographer node created and the image nodes created in Step S232 illustrated in FIG. 23 (S253). Here, note that the setting of links is performed according to the people cluster information and the photographer likelihood degrees obtained.

Next, the photographer link setting unit 75 sets links between the photographer node and the photo-subject nodes (S254).

Note that here, the setting of links between the image nodes and the photographer node is performed only when the people cluster that the photographer node belongs to and the people cluster that the person having been specified as the photographer of the image belongs to is the same.

In addition, the setting of links between the photo-subject nodes and the photographer node is performed only when the people cluster that a photo-subject node belongs to and the people cluster that the photographer node belongs to is the same.

The rules applied when setting the links between the nodes are as follows.

(3) A value of a link directed from an image node to the photographer node is a value obtained by multiplying the photographer likelihood degree of the people cluster that has been specified as the photographer of the image and the fixed value $(1-\beta)$. Here, the photographer likelihood degree is that calculated with respect to the image.

(4) A value of a link directed from the photographer node to an image node is a value obtained by multiplying the photographer likelihood degree of the people cluster that has been specified as the photographer of the image and a fixed value $\delta$. Here, the photographer likelihood degree is that calculated with respect to the people cluster.

(5) A value of a link directed from the photographer node to a photo-subject node is a value obtained by subtracting the fixed value $\delta$ from "1".

(6) A value of a link directed from a photo-subject node to the photographer node is a value obtained by subtracting the fixed value $\gamma$ from "1".

Figure 26:
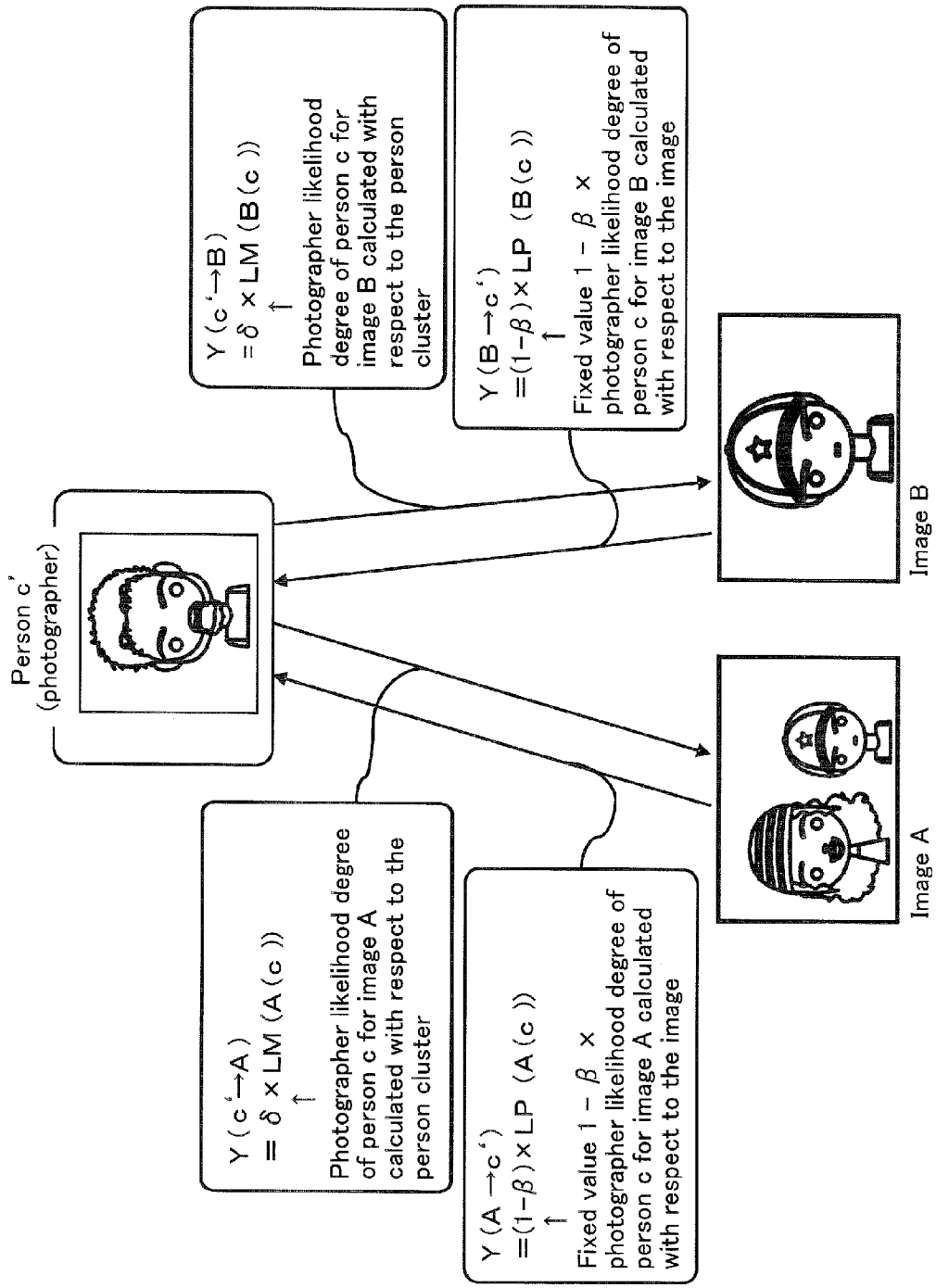
FIG. 26 illustrates link setting between the image nodes and a photographer node.

FIG. 26 illustrates an example of link setting between image nodes and the photographer node.

According to the rules (3) and (4) provided in the above, the links are set as follows. A value of a link (Y (A→c')) directed from image A to person c' is a value $((1-\beta) \times LP(A(c)))$ obtained by multiplying a value $(1\beta)$ obtained by subtracting the fixed value $\beta$ from "1" and a photographer likelihood degree (LP (A (c))) for the image of person c' in image A.

Contrariwise, a value of a link (Y (c'→A)) directed from the person c' to image A is a value ($\delta \times$LM (A (c))) obtained by multiplying the fixed value $\delta$ and a photographer likelihood degree (LM (A (c))) for the people cluster of person c in image A.

Figure 27:
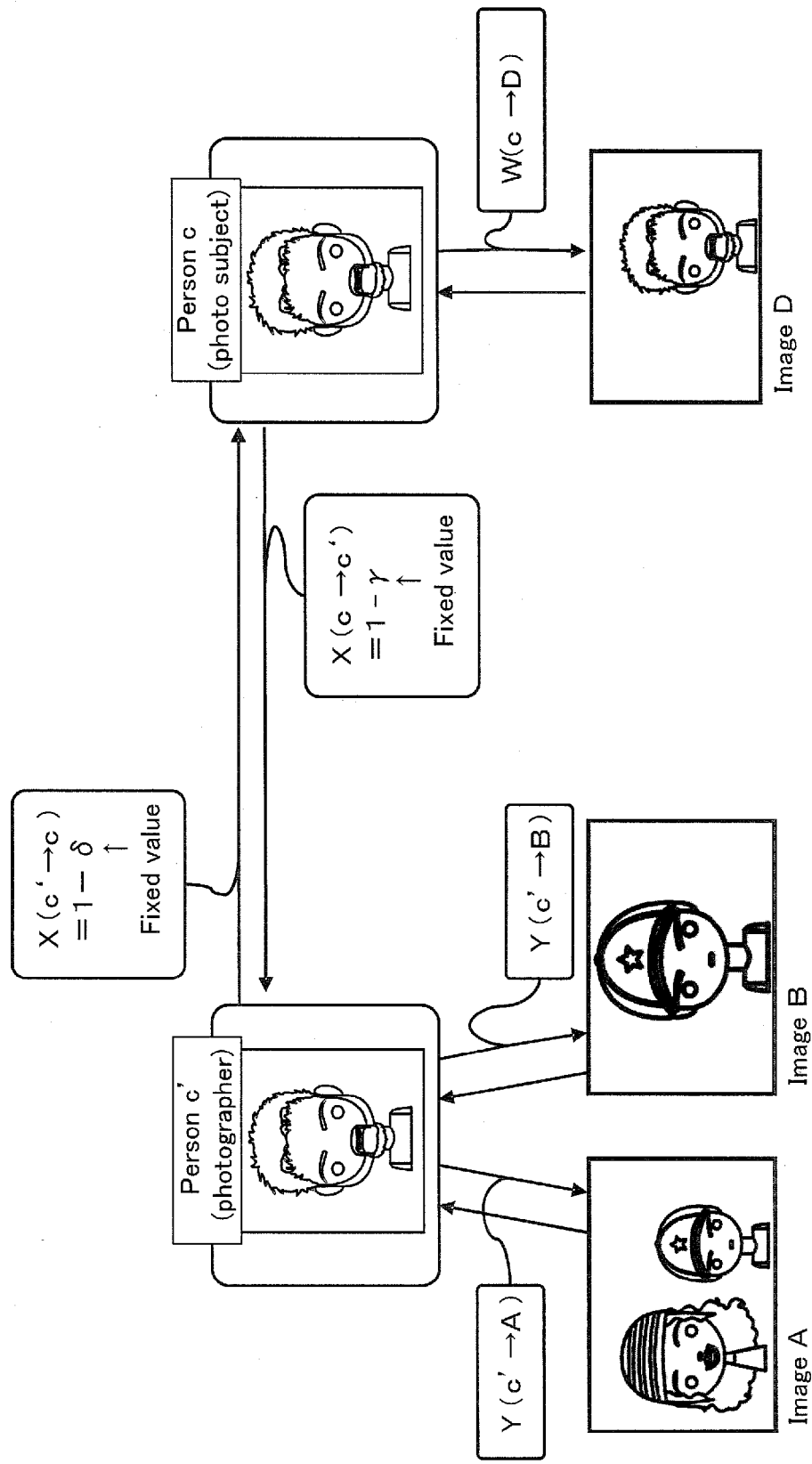
FIG. 27 illustrates link setting between the photographer node and a photo-subject node.

Subsequently, FIG. 27 illustrates an example of link setting between the photo-subject nodes and the photographer node.

According to the rules (5) and (6) provided in the above, the links are set as follows. A value of a link (X (c'→c)) directed from person c' to person c is a value $(1-\delta)$ obtained by subtracting the fixed value $\delta$ from "1". Contrariwise, a value of a link (X (c→c')) directed from person c to person c' is a value $(1-\gamma)$ obtained by subtracting the fixed value $\gamma$ from "1".

Figure 28:
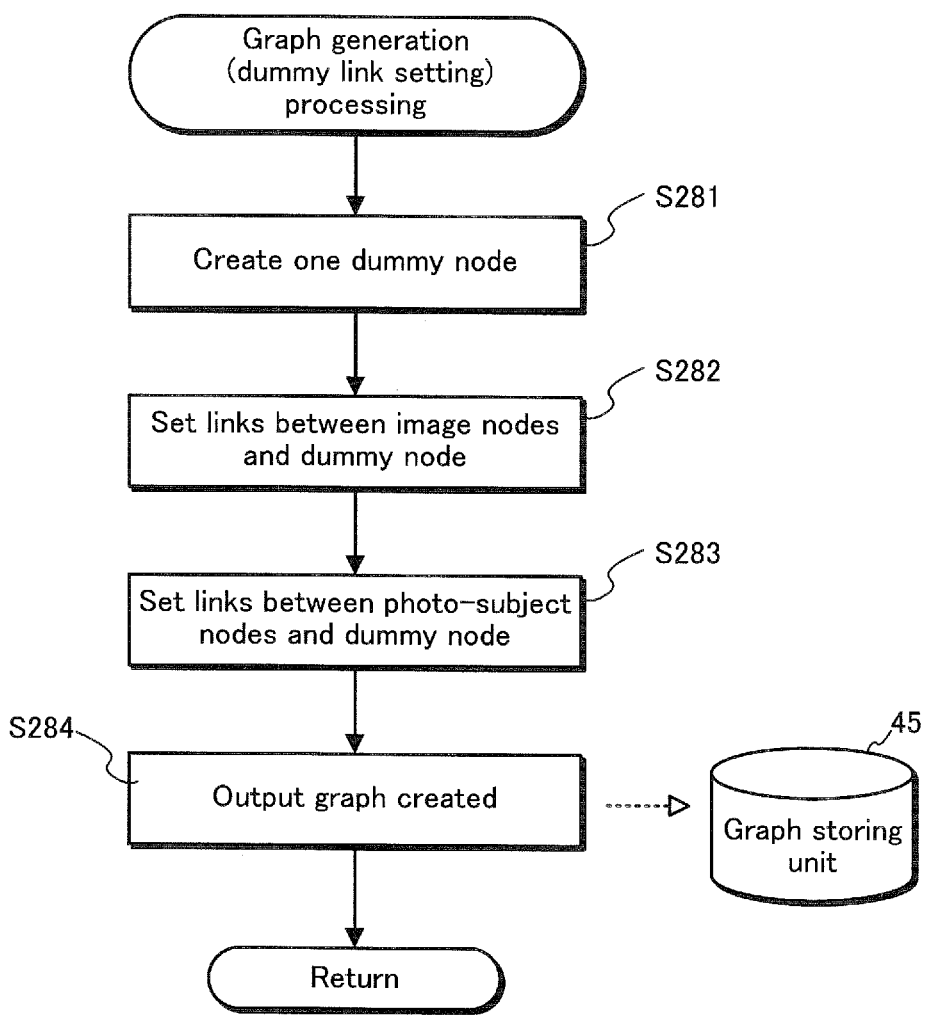
FIG. 28 is a flowchart illustrating graph generation (dummy link setting) processing.

Subsequently, description is provided on the graph generation (dummy link setting) processing (FIG. 2: S27) with reference to FIG. 28.

The dummy node generating unit 73 creates one dummy node (S281).

Figure 23:
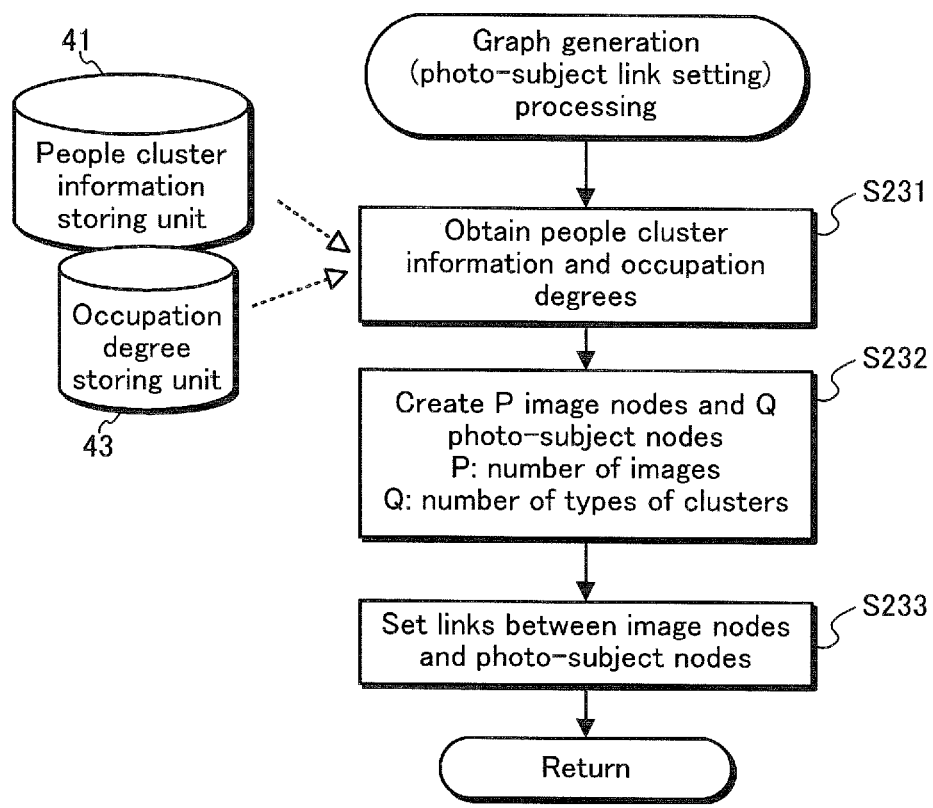
FIG. 23 is a flowchart illustrating graph generation (photo-subject link setting) processing.

Following this, the dummy link setting unit 76 of the graph generating unit 70 sets links between the image nodes created in Step S232 illustrated in FIG. 23 and the dummy node (S282), and further sets links between the photo-subject nodes and the dummy node (S283).

The rules applied when setting (i) the links between the image nodes and the dummy node and (ii) the links between the photo-subject nodes and the dummy node are as follows. Note that, in the rules described in the following, links are not set when the value of a link between the dummy node and a photo-subject nodes or a link between the dummy node and a photographer node is "0".

(7) A value of a link directed from an image node to the dummy node is a value obtained by subtracting the values of all links directed from the image node to the photo-subject nodes and the photographer node from "1". The links directed from the image node to the photo-subject nodes and the photographer node are set according to the above-described rules (1)-(4).

(8) A value of a link directed from a photo-subject node to a dummy node is a value obtained by subtracting the values of all links directed from the photo-subject node to the image nodes and the photographer node from "1". The links directed from the image node to the photo-subject nodes and the photographer node are set according to the above-described rules (1)-(6).

(9) Values of links directed from the dummy node to an image node and from the dummy node to a photo-subject node take a fixed value E.

Figure 29:
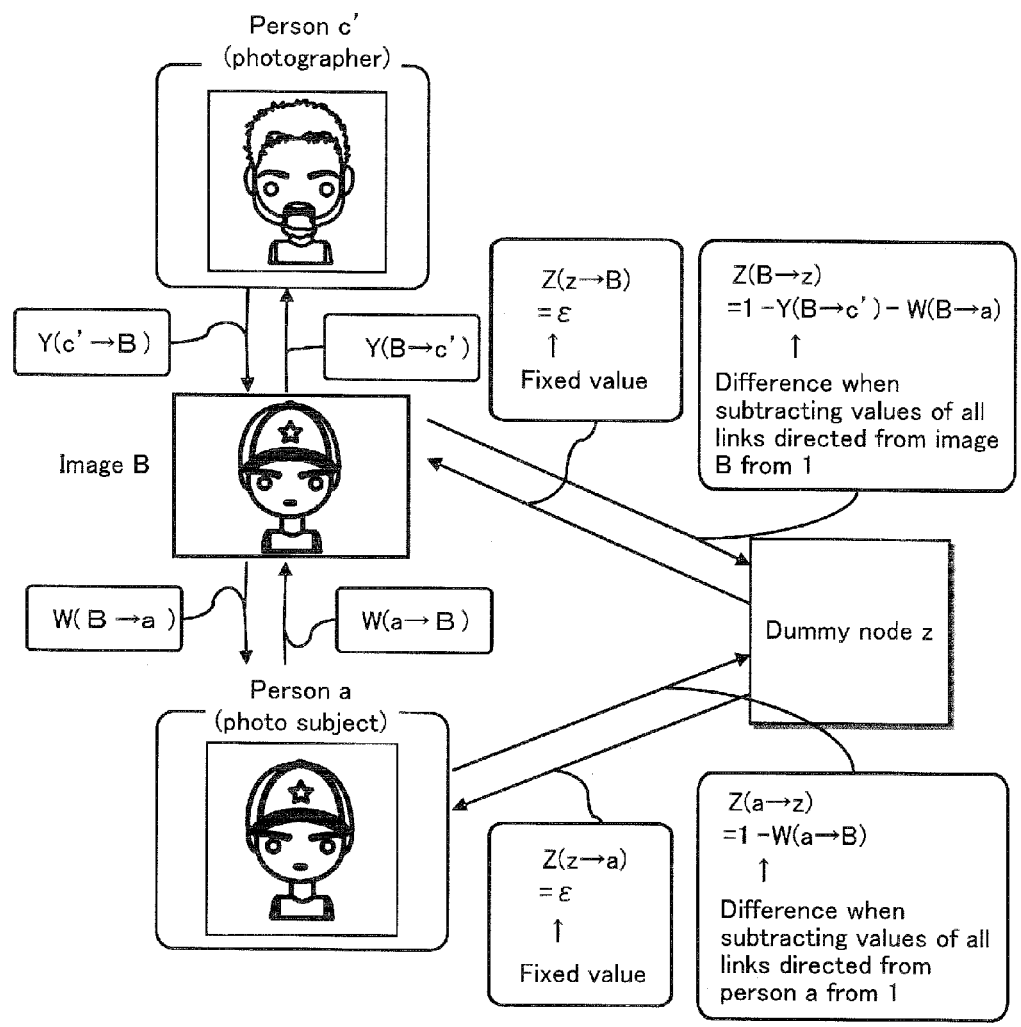
FIG. 29 illustrates link setting between an image node and a dummy node.

FIG. 29 illustrates an example of link setting between image nodes and the dummy node and between photo-subject nodes and the dummy node.

According to the rules (7)-(9) provided in the above, the links are set as follows. A value of a link (Z (B→z)) directed from image B to dummy node z is a value $(1-W (B→c')-Y (B→a))$ obtained by subtracting (i) a value of the link W (B→c') directed from image B to the photographer node corresponding to person c, who is the photographer of image B, and (ii) a value of a link Y (B→a) directed from image B to the photo-subject node appearing in image B from "1".

Further, a value of a link (Z (a→z)) directed from person a to dummy node z is a value $(1-W (a→B))$ obtained by subtracting a value of a photo-subject link W (a→B) directed from person a to image B from "1". In addition, a value of a link (Z (z→B)) directed from dummy node z to image B, and a value of a link (Z (z→a)) directed from dummy node z to person a is a predetermined fixed value $\epsilon$.

Finally, the graph generating unit 70 outputs a graph to the graph storing unit 45 (S284). The graph output by the graph generating unit 70 includes the nodes created as described in the above and the links set between the nodes.

Figure 30:
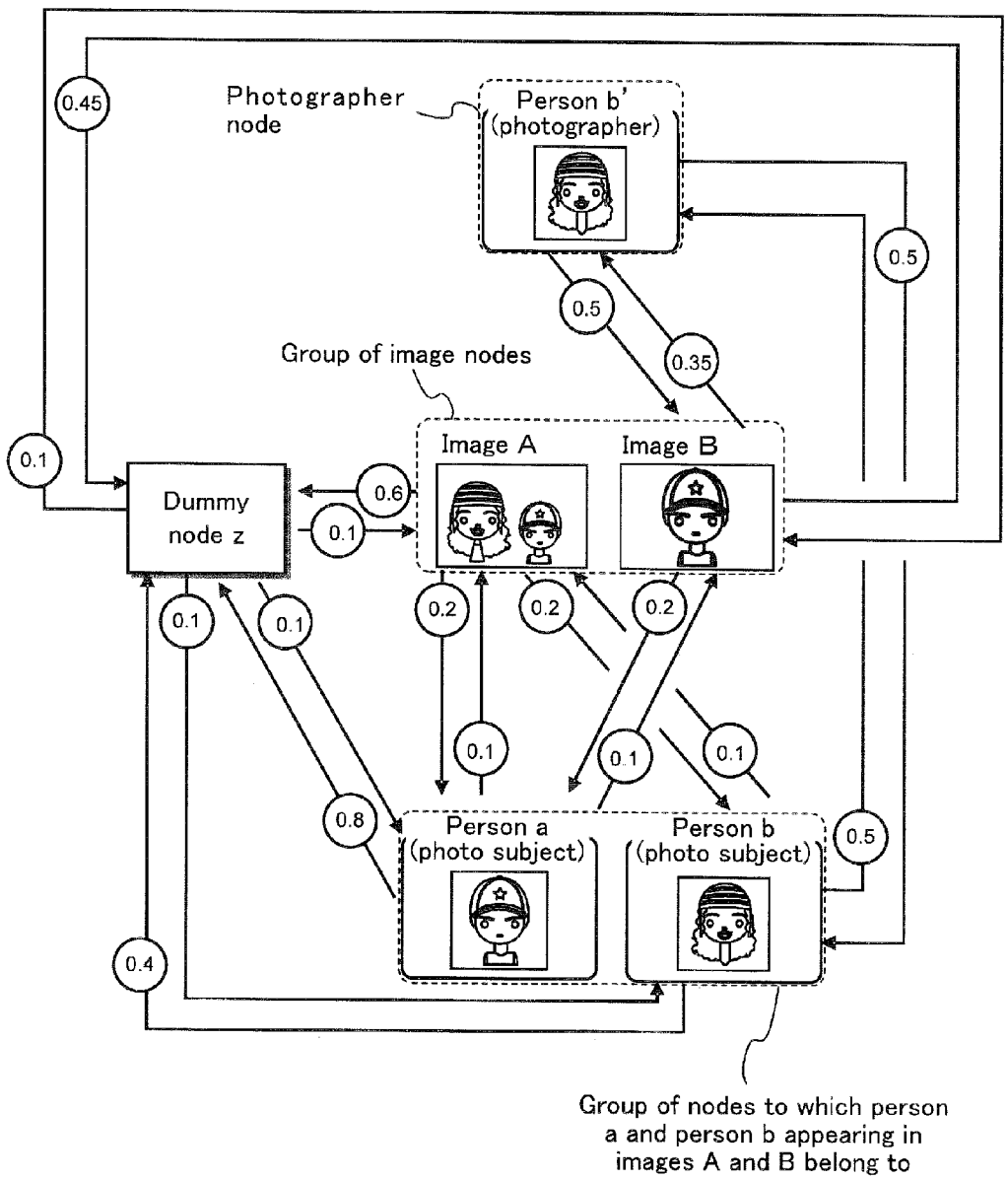
FIG. 30 illustrates a specific example of a graph.

Illustration is provided of one example of the graph in FIG. 30.

In the graph illustrated in FIG. 30, links are set according to the above-described rules (1)-(9) between image nodes corresponding to images A and B, photo-subject nodes corresponding to person a and person b, a photographer node corresponding to person b', and dummy node z. In addition, person b corresponding to the photographer node is the main subject person of the graph illustrated in FIG. 30.

Here, it should be noted that the graph storing unit 45 converts the graph output from the node creating unit 70 into a table before storing the table therein. FIG. 31 illustrates a table corresponding to the graph illustrated in FIG. 30.

Subsequently, explanation is provided of the adjacency matrix generation and eigenvector calculation processing (FIG. 2: S28) with reference to FIG. 32.

As for the method for evaluating each of components of a matrix according to an adjacency matrix, the method as disclosed in the Referenced Document 3, which is provided in the following, may be applied.

Firstly, the adjacency matrix generating unit 81 generates an adjacency matrix M by using the table stored in the graph storing unit 45 (S321). When, for instance, the table illustrated in FIG. 31 is used, an adjacency matrix M as illustrated in FIG. 33 is generated. The adjacency matrix M illustrated in FIG. 33 is a six×six square matrix (six rows×six columns).

Figure 32:
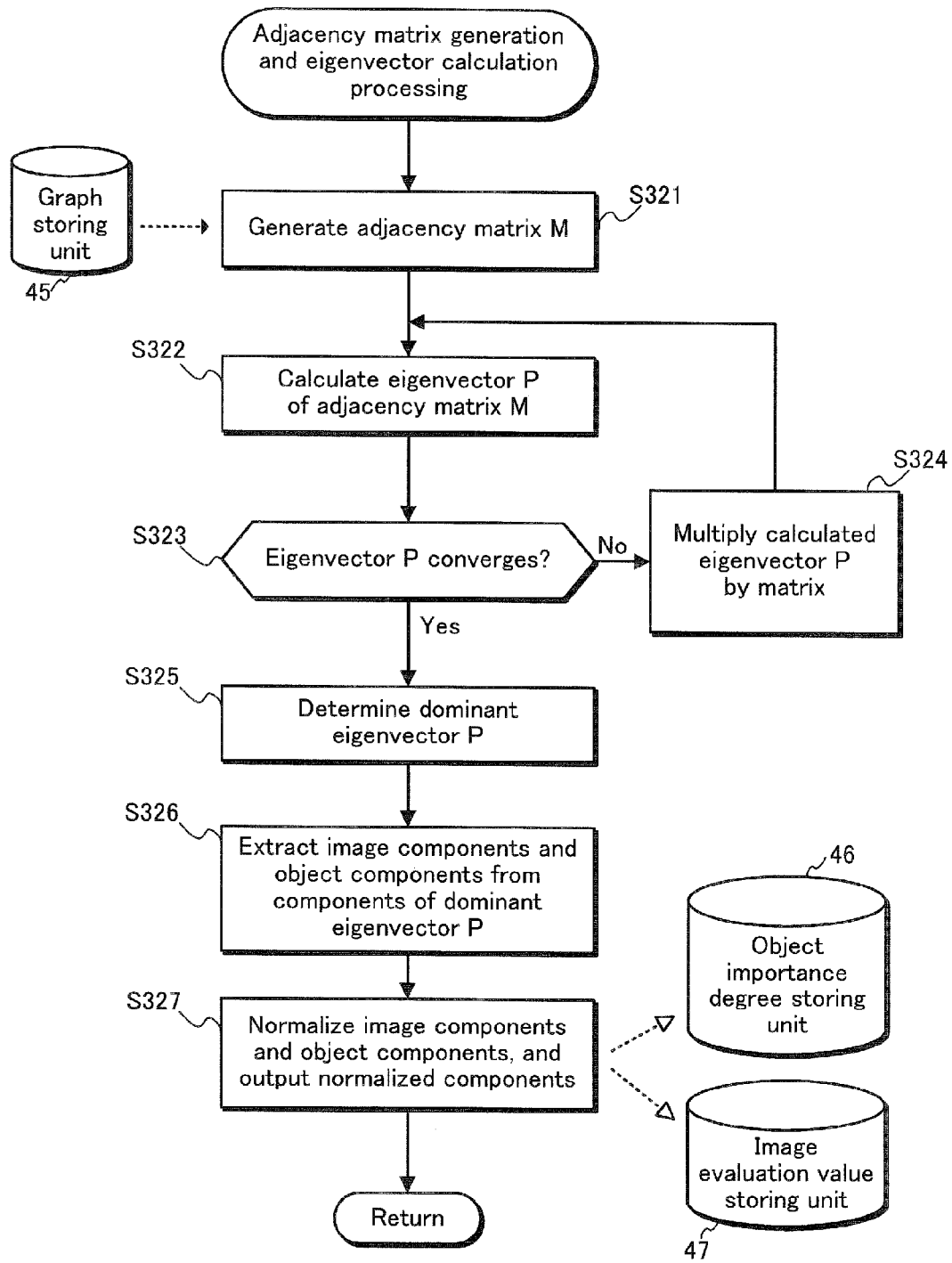
FIG. 32 is a flowchart illustrating adjacency matrix generating and eigenvector calculating processing.

Subsequently, the eigenvector calculation unit 82 calculates an eigenvector of the adjacency matrix M. The processing performed in Steps S322-S324 in FIG. 32 is, in specific, a power method operation. The power method is one method for simultaneously obtaining both a dominant eigenvalue and a dominant eigenvector belonging to the dominant eigenvalue.

That is, by using the following formula:

$$MP = \lambda P \quad \text{(Equation 4)},$$

an eigenvector P satisfying the adjacency matrix M when $\lambda$ is a fixed number can be obtained (S322). When the eigenvector P does not converge (S323: No), the original matrix is multiplied to the eigenvector P obtained (S324). The calculation in S324 is recursively and iteratively performed until the eigenvector P of the matrix finally converges (S323: Yes).

Subsequently, the eigenvector calculation unit 82 determines, as the dominant eigenvector P, the converged eigenvector P (S325). The importance degree calculation unit 83 extracts, from the components of the dominant eigenvector P, image components and object components (S326).

Finally, the importance degree calculation unit 83 normalizes each of the image components and the object components (normalization is performed such that the total of each of the components equals "1"), and outputs the normalized components to the image importance degree storing unit 46 and the image evaluation value storing unit 47 (S327).

In the following, detailed explanation is provided on the processing in Steps S326 and S327 with reference to FIG. 34.

As illustrated in FIG. 34, the object importance degrees of person a and person b and the image evaluation values of images A and B can be relatively evaluated by (i) extracting, from the dominant eigenvector P=(0.80, 0.62, 0.09, 0.09, 0.18, 0.18) (portion (a) of FIG. 34), the components corresponding to images A and B and the components corresponding to person a and person b (portion (b) of FIG. 34), and (ii) performing normalization of the extracted components (portion (c) of FIG. 34).

The calculation of image evaluation values as described in the above is based on a graph where person b is the main subject person (refer to FIG. 30). Thus, the object importance degrees and the image evaluation degrees obtained as a result of the calculation in this case are those when making evaluations focusing on person b.

Figure 35A:
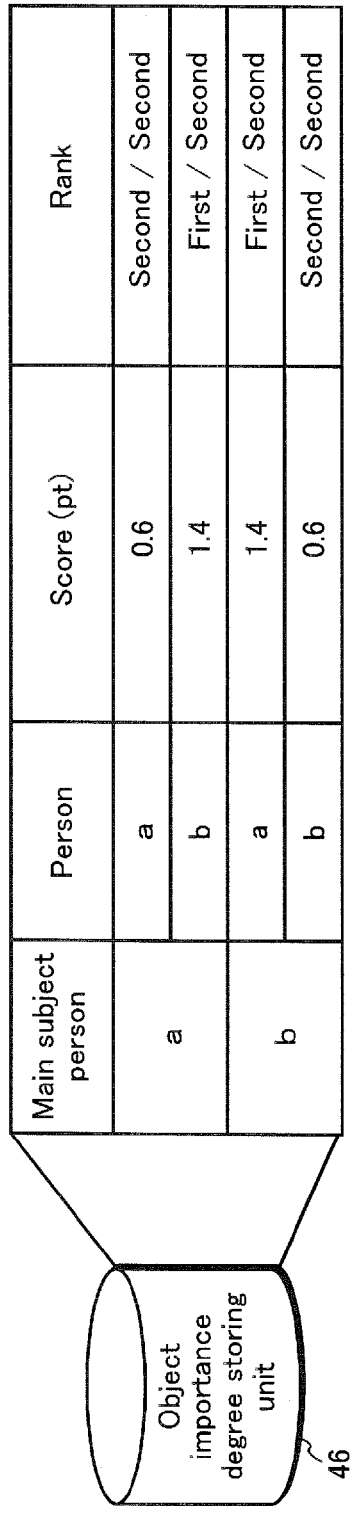
FIG. 35A illustrates contents stored in an object importance degree storing unit 46 and FIG. 35B illustrates contents stored in an image evaluation value storing unit 47.
Figure 35B:
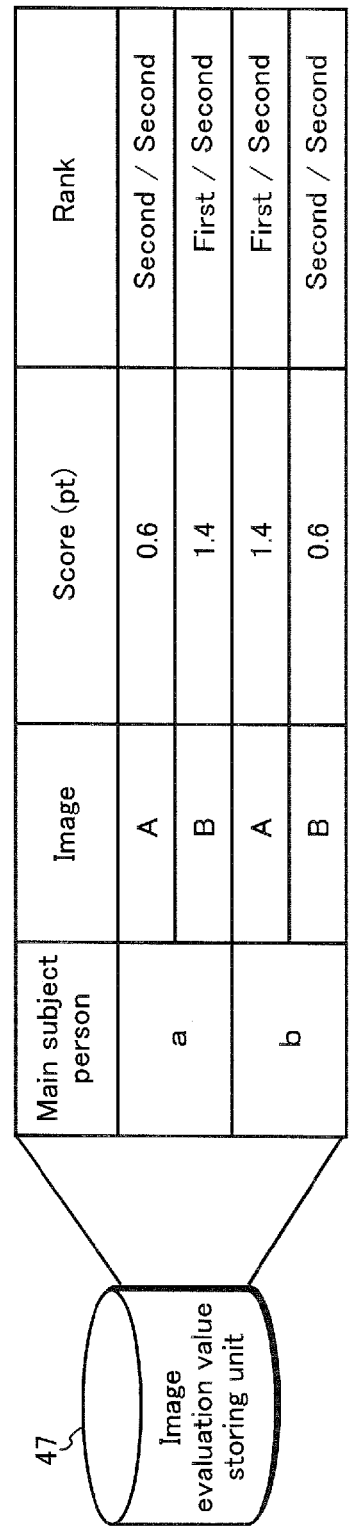

FIGS. 35A and 35B respectively illustrate a data structure of the object importance degrees and the data structure of the image evaluation values. Both the object importance degrees and the image evaluation values are results of the importance degree calculation processing as described in the above. The data structure of the object importance degrees and the image evaluation values commonly include the items: "main subject person"; "person"; "score"; and "rank". The item "main subject person" indicates each of the people appearing in the images. Since the object importance degrees and image evaluation values are calculated focusing on the main subject person and according to the objects photographed by the main subject person and the objects appearing in images concurrently with the main subject person, the object importance degrees and the image evaluation values are stored for each of the people, or that is, for each of the main subject people. In addition, the values in the item "score" indicate object importance degrees in the data structure of the object importance degrees, whereas in the data structure of the image evaluation values, the values in the item "score" indicate image evaluation values.

As description has been provided in the above, each of the people appearing in the images is considered as a main subject. Thus, objects that are photographed frequently, as well as objects frequently appearing in the images together with the main subject, are considered as objects of importance, and thus, images in which such objects of high importance appear are provided with a high score of evaluation.

Further, by recursively calculating the eigenvector of the adjacency matrix M, which indicates the links set between the above-described nodes, importance propagates from one object to another. Hence, other objects photographed by the photographer and being related to an object of high importance can be considered as an important object as well and can be provided with a high importance degree.

In the following, explanation is provided on the propagation of importance between objects by referring to a specific example illustrated in FIGS. 36A-36C. Here, description is provided under the presumption that the frequency degrees indicating frequency of appearance of 4 clusters, person a (son), person c (son's father), person d (son's grandmother), and person e (son's friend) fulfill the relation person a>person c>person d>person e, and person a has an exceedingly high frequency degree compared to the other clusters (which indicates that person a is of high importance) (FIG. 36A).

Further, the evaluation-target images include: an image, as indicated by image H, of person e photographed by person a; an image, as indicated by image I, of person d photographed by person c; an image, as indicated by image J, where person a appears together with person e; and an image, as indicated by image K, where person c appears together with person d (FIG. 36B).

When performing the evaluation of such images focusing on person a as the main subject, the importance of person e is increased by appearing in the same image with person a. As such, images in which person e appears are provided with higher image evaluation values compared to images in which people c and d appear.

Similarly, when performing the evaluation of such images focusing on person c as the main subject, the importance of person d is increased by appearing in the same image with person c. As such, images in which person d appears are provided with higher image evaluation values compared to images in which people a and e appear (FIG. 36C).

As can be seen from the above, depending upon the person who is set as the main subject of evaluation, there are cases where the image evaluation values of images in which a person being related to the main subject but not appearing frequently in the images appears alone is provided with a higher image evaluation values compared to images in which other people having a higher frequency degree appear.

Further, according to the present embodiment, by setting links between the photographer node and the image nodes, importance can be propagated between nodes based on correlations established through the production of the images.

Figure 37A:
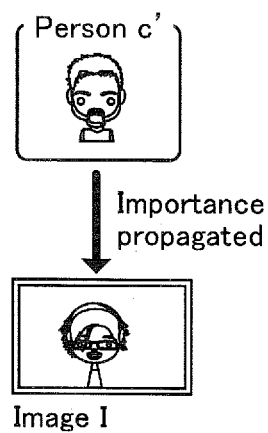
FIGS. 37A and 37B illustrate how importance propagates between nodes.

For instance, FIG. 37A illustrates a case where importance is propagated from person c' corresponding to the photographer node to image I corresponding to an image node.

In addition, according to the present invention, importance can be propagated between objects when different people appear together in a single image (concurrency).

Figure 37B:
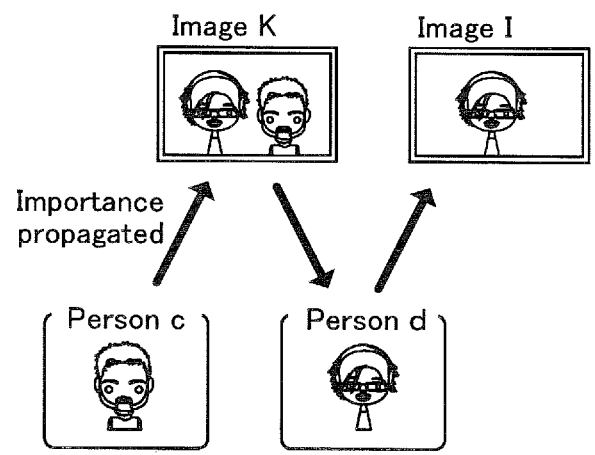

For instance, FIG. 37B illustrates a case where importance is propagated from person c corresponding to a person node to image K corresponding to an image node. As a result, the importance of image K is comparatively increased, and thus, importance propagates to person d, and further, to image I via person d.

<Supplement 1>

Although description has been made in the above on an embodiment of the present invention, it is to be understood that the present invention is not limited thereto. The present invention is applicable in various embodiments and modifications which are for achieving the above mentioned aim of the present invention or other aims related or associated thereto. For instance, the following modifications are construed as being within the scope and spirit of the present invention.

(1) In the embodiment, description has been provided taking the occupation degree calculated by the occupation degree calculating unit 51 as one example, of the object appearance characteristic value. However, the present invention is not limited to this.

For instance, an object appearance characteristic value calculating unit 50 illustrated in FIG. 38A may include: a smile degree calculating unit 52; a depth-of-field calculating unit 53; and a face orientation calculating unit 54, in addition to the occupation degree calculating unit 51. The smile degree calculating unit 52 calculates a smile degree of each of the people appearing in the images, the depth-of-field calculating unit 53 calculates a degree of focus of each of the people appearing in the images, and the face orientation calculating unit 54 calculates an orientation of the face for each of the people appearing in the images.

The smile degree calculated by the smile degree calculating unit 52 indicates a high value when a person appearing in the image is smiling (FIG. 38B). Contrariwise, the smile degree indicates a low value when a person appearing in the image is not smiling (FIG. 38C).

The depth of field calculated by the depth-of-field calculating unit indicates a high value when a person appears sharply in the image. Contrariwise, the depth of field indicates a low value when a person appears blurred in the image.

A face orientation value calculated by the face orientation calculating unit 54 indicates a high value when a person's face is facing the front in the image. Contrariwise, the face orientation value indicates a low value when a person's face is facing more to a direction other than the front in the image.

The smile degree, the depth of field, and the face orientation degree may be used as well as the occupation degree (or in place of the occupation degree) in the setting of links between the photo-subject nodes and the image nodes (refer to FIG. 24).

(2) In the embodiment, description has been made that the photographer node always corresponds to one of the multiple photo-subject nodes, such that, for instance, the photographer node of person b in FIG. 30 corresponds to the photo-subject node of person b. However, the present invention is not limited to this.

That is, the photographer node may be a person not appearing in the images as a photo-subject node (a person not appearing in any of the images).

(3) In the embodiment, description has been provided based on the presumption made that objects in the images are people. However, the present invention is not limited to this, and the objects may be animals and other objects. Thus, the extraction, the clustering, the evaluation of importance and the like as described in the embodiment may be performed with respect to objects other than people.

For instance, in the example illustrated in FIG. 39, a car O1, a dog O2, and a baby O3 are extracted from images as objects.

Figure 12:
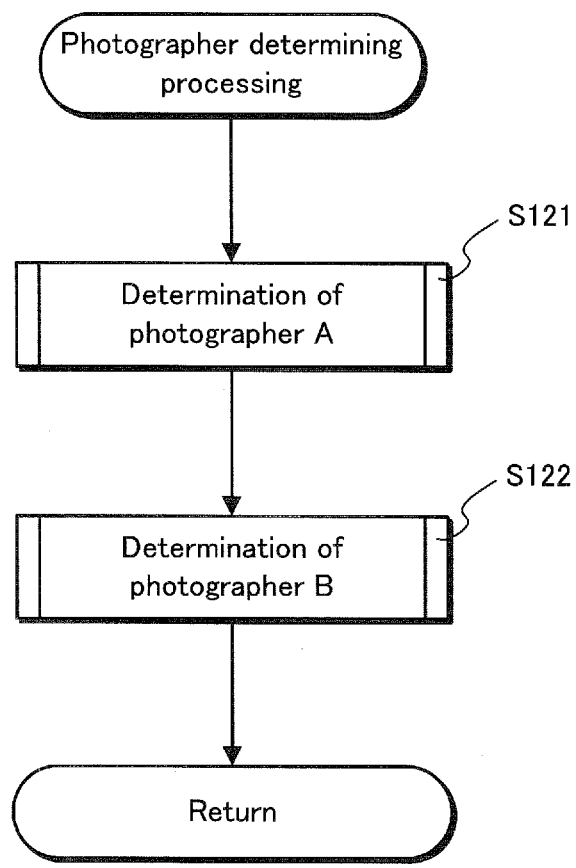
FIG. 12 is a flowchart illustrating photographer determining processing.

However, since it is not realistic to specify objects other than humans as the photographer of images, objects such as the car O1 and the dog O2 may be excluded from the target of determination in the photographer determining processing (FIG. 12). Alternatively, a correction of reducing the photographer likelihood degrees provided to such objects may be made with respect to such objects.

In addition, similar to the car O1 and the dog O2, there is a very low probability that the baby O3 is the photographer of images. Thus, the baby O3 may be considered as being similar to the car O1 and the dog O2.

Further, the baby O3 may be treated as a separate "baby" object when it can be assumed that the baby O3 is less than three years old. Such an assumption can be made by applying a conventional technology (facial feature extraction technology) of estimating an age of a person by analyzing such aspects as the skeletal structure of the face and wrinkles and slack appearing on the skin.

(4) In the embodiment, description has been made that method B for determining the photographer of an image is performed only when the photographer of the image remains undetermined even after method Z and method A have been applied. However, the present invention is not limited to this.

For instance, the determination of photographer B (FIG. 12: S122) may be performed in parallel with the determination of photographer A (FIG. 12: S121), and both photographer A and photographer B may be specified as the photographer of the target image.

Further, the order in which the three methods Z, A, and B are performed is not limited to that described in the embodiment. In addition, other methods for determining the photographer of a target image may be applied.

(5) In the embodiments, description has been made that evaluation target images are stored to the SD memory card 2. However, the present invention is not limited to this, and evaluation target images may be stored in any recording medium, including: a Smart Media; a Compact Flash™; a Memory Stick™; an SD memory card; a multimedia card; a CD-R/RW; a DVD±R/RW; a DVD-RAM; an HD-DVD; and a BD (Blu-ray Disc).

In addition, images may be obtained by connecting the image evaluation apparatus to a photography device storing images, such as a digital camera and a mobile phone. The connection between the image evaluation apparatus and such devices may be wired connections (a LAN cable, a USB cable, and etc.), wireless connections (an infrared connection, a Bluetooth connection, and etc.), and other connections of various types.

(6) The image evaluation apparatus pertaining to the embodiment of the present invention may be typically implemented as an LSI (Large Scale Integration), which is a type of integrated circuit. Further, each of the circuits may be separately integrated into a single chip, or the functions may be integrated into a single chip including a part or all of the circuits. Although description has been made on the basis of an LSI in the above, the name of the integrated circuit may differ according to the degree of integration of the chips. Other integrated circuits include an IC (integrated circuit), a system LSI, a super LSI, and an ultra LSI. Further, the method applied for forming integrated circuits is not limited to the LSI, and the present invention may be realized on a dedicated circuit or a general purpose processor. For example, the present invention may be realized on a FPGA (Field Programmable Gate Array) being an LSI which can be programmed after manufacturing, or a reconfigurable processor being a LSI, reconfiguration of which could be made to the connection of internal circuit cells and settings.

Further in addition, if a new technology of circuit integration replacing that of the LSI emerges as a result of the progress made in the field of semiconductor technology or another technology deriving therefrom, the integration of function blocks may be performed applying such technology. At this point, there is a possibility of biotechnology being applied to induce the future development of circuit integration technology.

(7) Program

A control program composed of program code for causing processors of various apparatuses including computers and various circuits connected to the processors to execute the image evaluation processing (FIG. 2 and the like) described in the embodiment may be distributed by recording the control program onto recording media, or by transmitting the control program via various communication paths.

Such recording media which can be used in the distribution of the control program include such recording media as: a Smart Media; a Compact Flash™; a Memory Stick™; an SD memory card; a multimedia card; a CD-R/RW; a DVD±R/RW; a DVD-RAM; an HD-DVD; and a BD (Blu-ray Disc).

Further, the control program, once distributed, is supplied for use by being stored to a processor-readable memory or the like, and the various functions described in the embodiment are realized by the processor executing the control program.

(8) In the embodiment, the evaluation of images is performed with respect to all images obtained by the image obtaining unit 10. However, the present invention is not limited to this, and the evaluation of images may be performed with respect to a group of images corresponding to a specific period of time, by selecting images corresponding to the specific, period of time prior to the execution of the evaluation.

The selection of images as referred to here may be performed by limiting the images subject to the image obtaining performed by the image obtaining unit 10 to images corresponding to the specific period of time, or by limiting the images used in the graph generation processing (refer to FIG. 2: S25-S27) by the graph generating unit 70 to a group of images corresponding to the specific period of time.

By making such arrangements, the results of the evaluation performed with respect to the images will reflect situations during the specific period. In addition, by repeatedly performing the calculation of evaluations while changing the main subject person every time (refer to FIG. 2: S24 and S29), the evaluation results obtained will reflect the human relationships of each of the users.

In the following, description is provided on an example illustrated in FIG. 40. FIG. 40 illustrates a ranking indicating the importance of people for each of the main subject people during a period from January, 2011 to February, 2011.

Note that, although the ranking in FIG. 40 is based on units of months, which is one example of the specific period of time, the specific period of time may be set to units of years, days, and events as well. Further, an arrangement may be made where the specific period of time is set to a given period, specification of which is received by a user.

<Supplement 2>

The following describes various aspects of the present invention.

(1) One aspect of the present invention is an image evaluation apparatus that calculates an importance degree of each of a plurality of images including objects, the image evaluation apparatus comprising: a characteristic value calculating unit that calculates, for an object appearing in an image, a characteristic value indicating a state of appearance of the object; a photographer extracting unit that determines a photographer of the image and that calculates a likelihood degree indicating accuracy of the determination of the photographer; and an evaluation unit that calculates an importance degree of the image according to the characteristic value and the likelihood degree.

(2) In the image evaluation apparatus, the objects included in the images may each belong to one of a plurality of object clusters, and the photographer extracting unit may specify one or more of the object clusters as the photographer of the image.

(3) In the image evaluation apparatus, the images may be each associated with one of a plurality of event clusters, an event cluster associated with a given image indicating an event that the given image belongs to, and the photographer extracting unit (i) may obtain, according to an event cluster associated with the image, other images that belong to the event cluster, (ii) may extract objects from the other images, and (iii) may specify, as the photographer, one or more object clusters corresponding to one or more objects that are not included in the image, among the objects extracted from the other images, and the photographer extracting unit may calculate a likelihood degree for each of the one or more object clusters specified.

(4) In the image evaluation apparatus, the photographer extracting unit may calculate, for each of the one or more object clusters specified, (i) a scarcity degree indicating how infrequently the object cluster appears in images belonging to the event cluster that the object cluster appears in and (ii) a photographer density degree indicating a frequency at which the object cluster is specified as the photographer in images having a production data and time close to a production date and time of the image, and the photographer extracting unit may calculate a likelihood degree for each of the one or more object clusters according to the scarcity degree and the photographer density degree.

(5) In the image evaluation apparatus, when none of the object clusters is specified as the photographer of the image by the photographer extracting unit, the photographer extracting unit may further (i) obtain, according to the event cluster associated with the image, images that belong to event clusters other than the event cluster associated with the image, (ii) extract objects included in the images that belong to event clusters other than the event cluster associated with the image, and (iii) specify, as the photographer of the image, an object cluster corresponding to an object that does not appear in the image, among the objects included in the images that belong to event clusters other than the event cluster associated with the image.

(6) In the image evaluation apparatus, the images may each be associated with one of a plurality of event clusters, an event cluster associated with a given image indicating an event that the given image belongs to, and the photographer extracting unit (i) may obtain, according to the event cluster associated with the image, images that belong to event clusters other than the event cluster associated with the image, (ii) may extract objects included in the images that belong to event clusters other than the event cluster associated with the image, and (iii) may specify, as the photographer of the image, an object cluster corresponding to an object that does not appear in the image, among the objects included in the images that belong to event clusters other than the event cluster associated with the image.

(7) In the image evaluation apparatus, when more than one object cluster is specified as the photographer of the image by the photographer extracting unit, the photographer extracting unit may calculate, for each of the more than one object clusters specified, (i) a familiarity degree that indicates familiarity between the object cluster and the object cluster that the object included in the image belongs to, and (ii) a scarcity degree indicating how infrequently the object cluster appears in images belonging to the event cluster that the object cluster appears in, and the photographer extracting unit may calculate, for each of the more than one object clusters specified, a photographer determination degree that is in accordance with the familiarity degree and the scarcity degree and may thereby specify, as the photographer of the image, an object cluster having the greatest photographer determination degree, among the more than one object clusters specified.

(8) In the image evaluation apparatus, the photographer extracting unit may attempt to obtain information pertaining to the photographer of the image from metadata provided to the image and may determine the photographer according to the information obtained.

(9) In the image evaluation apparatus, the evaluation unit may calculate an importance degree of the photographer of the image in addition to the importance degree of the image, the calculation of importance degrees being performed such that importance propagates from the importance degree of the photographer to the importance degree of the image.

(10) In the image evaluation apparatus, the objects included in the images may each belong to one of a plurality of object clusters, and the evaluation unit may calculate an importance degree of each of the object clusters in addition to the importance degree of the image and the importance degree of the photographer, the calculation of importance degrees being performed such that importance propagates from the importance degree of the image to the importance degree of the object cluster.

(11) The image evaluation apparatus may further comprise: a creating unit that creates a data structure including a plurality of image elements respectively indicating the plurality of images, a plurality of object cluster elements respectively indicating object clusters that the objects belong to, and a photographer element indicating the photographer of the image, a first link setting unit that sets a value of a link between the image element corresponding to the image and the photographer element corresponding to the photographer of the image according to the likelihood degree; and a second link setting unit that sets a value of a link between an image element corresponding to the image and an object cluster element corresponding to an object cluster that the object belongs to according to the characteristic value, wherein the evaluation unit may calculate the importance degree of the image according to the values of the links set with respect to the image element corresponding to the image.

(12) In the image evaluation apparatus, the creating unit may set one of the object cluster elements as a main subject element indicating a main subject of the evaluation performed with respect to the image, the main subject element may correspond to the photographer element in the data structure, and the first link-setting unit may set a value of a link between the main subject element and the image element corresponding to the image, the main subject being specified as the photographer of the image.

According to this, the calculation of importance degrees of images can be performed, where evaluation of an image is performed by setting the main subject person as the main subject of the evaluation.

(13) In the image evaluation apparatus, the data structure may include: image nodes as the image elements; object cluster nodes as the object cluster elements; and a photographer node as the photographer element, the first link setting unit may set a value of a link between an image node corresponding to the image and the photographer node, the second link setting unit may set a value of a link between the image node and an object cluster node corresponding to the object cluster that the object belongs to, the image evaluation apparatus may further comprise an adjacency matrix generating unit that generates an adjacency matrix representing a graph that includes each of the nodes created by the creating unit and the values of the links set by the first link setting unit and the second link setting unit, the evaluation unit may include: an eigenvector calculating unit calculating a dominant eigenvector for the adjacency matrix; and an importance degree calculating unit calculating an importance degree of the image and an importance degree of the object cluster according to elements of the dominant eigenvector.

(14) Another aspect of the present invention is an image evaluation method for calculating an importance degree of each of a plurality of images including objects, the image evaluation method comprising: a characteristic value calculating step of calculating, for an object appearing in an image, a characteristic value indicating a state of appearance of the object; a photographer extracting step of determining a photographer of the image and calculating a likelihood degree indicating accuracy of the determination of the photographer; and an evaluation step of calculating an importance degree of the image according to the characteristic value and the likelihood degree.

(15) Another aspect of the present invention is a program causing a computer to execute image evaluation processing of calculating an importance degree of each of a plurality of images including objects, wherein the image evaluation processing includes: a characteristic value calculating step of calculating, for an object appearing in an image, a characteristic value indicating a state of appearance of the object; a photographer extracting step of determining a photographer of the image and calculating a likelihood degree indicating accuracy of the determination of the photographer; and an evaluation step of calculating an importance degree of the image according to the characteristic value and the likelihood degree.

(16) Another aspect of the present invention is an integrated circuit that calculates an importance degree of each of a plurality of images including objects, the integrated circuit comprising: a characteristic value calculating unit that calculates, for an object appearing in an image, a characteristic value indicating a state of appearance of the object; a photographer extracting unit that determines a photographer of the image and that calculates a likelihood degree indicating accuracy of the determination of the photographer; and an evaluation unit that calculates an importance degree of the image according to the characteristic value and the likelihood degree.

REFERENCED DOCUMENTS (1) Referenced Document 1

"Face Recognition Using Weighted Matching by Information of Gabor Features" Kazuhiro Hotta (Saitama University (JSPS Research Fellow)) et al. Technical report of IEICE (The Institute of Electronics, Information and Communication Engineers), HIP, Technical Committee on Human Information Processing, 100(34), 31-38 20000504

(2) Referenced Document 2

John C. Platt, Mary Czerwinski, Brent A. Field: PhotoTOC: Automatic Clustering for Browsing Personal Photographs, Fourth IEEE Pacific Rim Conference on Multimedia (2003)

(3) Referenced Document 3

The PageRank citation ranking: Bringing order to the Web Page, Lawrence; Brin, Sergey; Motwani, Rajeev and Winograd, Terry (1999).

INDUSTRIAL APPLICABILITY

The present invention provides an image evaluation apparatus that enables a user to efficiently search for and find images which are important for the user, from among a vast collection of images owned by multiple users including the user, the user's family and the like. Compared to conventional image evaluation methods, the user is able to search for and view desired contents more easily and without trouble.

In addition, the present invention is useful in stationary-type terminals such as personal computers, server terminals and the like. Further, the present invention is also useful in mobile terminals such as digital still cameras and mobile phones.

REFERENCE SIGNS LIST 1 image evaluation system
2 SD memory card
3 image evaluation device
4 display
10 image obtaining unit
20 object extracting unit
21 object characteristic value extracting unit
22 object clustering unit
30 event extracting unit
31 production date/time extracting unit
32 event clustering unit
40 storing unit
41 people cluster information storing unit
42 event cluster information storing unit
43 occupation degree storing unit
44 photographer likelihood degree storing unit
45 graph storing unit
46 object importance degree storing unit
47 image evaluation value storing unit
50 object appearance characteristic value calculating unit
51 occupation degree calculating unit
60 photographer extracting unit
61 photographer obtaining unit
62 photographer determining unit
63 photographer likelihood degree calculation unit
70 graph generating unit
71 image and photo subject node generating unit
72 photographer node generating unit
73 dummy node generating unit
74 photo subject link setting unit
75 photographer link setting unit
76 dummy link setting unit
80 evaluating unit
81 adjacency matrix generating unit
82 dominant eigenvector calculating unit
83 importance degree calculating unit
90 display controlling unit

The invention claimed is:

1. An image evaluation apparatus that calculates an importance degree of each of a plurality of images including objects, the image evaluation apparatus comprising:
a processor; and
a non-transitory memory storing executable instructions, which when executed, cause the processor to operate as:
a characteristic value calculating unit that calculates, for each of the objects appearing in each of the images, a characteristic value indicating a state of appearance of the object;
a photographer extracting unit that, for each of the images, (i) determines a photographer of the image and (ii) calculates a likelihood degree indicating accuracy of the determination of the photographer; and
an evaluation unit that calculates an importance degree of each of the images according to the characteristic values of the objects in the images and the likelihood degrees of the photographers of the images.

2. The image evaluation apparatus of claim 1, wherein
the objects included in the images each belong to one of a plurality of object clusters, and
the photographer extracting unit specifies one or more of the object clusters as the photographer of the image.

3. The image evaluation apparatus of claim 2, wherein
the images are each associated with one of a plurality of event clusters, an event cluster associated with a given image indicating an event that the given image belongs to, and the photographer extracting unit (i) obtains, according to an event cluster associated with the image, other images that belong to the event cluster, (ii) extracts objects from the other images, and (iii) specifies, as the photographer, one or more object clusters corresponding to one or more objects that are not included in the image, among the objects extracted from the other images, and
the photographer extracting unit calculates a likelihood degree for each of the one or more object clusters specified.

4. The image evaluation apparatus of claim 3, wherein
the photographer extracting unit calculates, for each of the one or more object clusters specified, (i) a scarcity degree indicating how infrequently the object cluster appears in images belonging to the event cluster that the object cluster appears in and (ii) a photographer density degree indicating a frequency at which the object cluster is specified as the photographer in images having a production data and time close to a production date and time of the image, and
the photographer extracting unit calculates a likelihood degree for each of the one or more object clusters according to the scarcity degree and the photographer density degree.

5. The image evaluation apparatus of claim 3, wherein
when none of the object clusters is specified as the photographer of the image by the photographer extracting unit, the photographer extracting unit further (i) obtains, according to the event cluster associated with the image, images that belong to event clusters other than the event cluster associated with the image, (ii) extracts objects included in the images that belong to event clusters other than the event cluster associated with the image, and (iii) specifies, as the photographer of the image, an object cluster corresponding to an object that does not appear in the image, among the objects included in the images that belong to event clusters other than the event cluster associated with the image.

6. The image evaluation apparatus of claim 2, wherein
the images are each associated with one of a plurality of event clusters, an event cluster associated with a given image indicating an event that the given image belongs to, and
the photographer extracting unit (i) obtains, according to the event cluster associated with the image, images that belong to event clusters other than the event cluster associated with the image, (ii) extracts objects included in the images that belong to event clusters other than the event cluster associated with the image, and (iii) specifies, as the photographer of the image, an object cluster corresponding to an object that does not appear in the image, among the objects included in the images that belong to event clusters other than the event cluster associated with the image.

7. The image evaluation apparatus of claim 6, wherein
when more than one object cluster is specified as the photographer of the image by the photographer extracting unit,
the photographer extracting unit calculates, for each of the more than one object clusters specified, (i) a familiarity degree that indicates familiarity between the object cluster and the object cluster that the object included in the image belongs to, and (ii) a scarcity degree indicating how infrequently the object cluster appears in images belonging to the event cluster that the object cluster appears in, and
the photographer extracting unit calculates, for each of the more than one object clusters specified, a photographer specification degree that is in accordance with the familiarity degree and the scarcity degree and thereby specifies, as the photographer of the image, an object cluster having the greatest photographer specification degree, among the more than one object clusters specified.

8. The image evaluation apparatus of claim 1, wherein
the photographer extracting unit attempts to obtain information pertaining to the photographer of the image from metadata provided to the image and determines the photographer according to the information obtained.

9. The image evaluation apparatus of claim 1, wherein
the evaluation unit calculates an importance degree of the photographers of the images in addition to the importance degrees of the images, the calculation of importance degrees being performed such that importance propagates from the importance degrees of the photographers to the importance degrees of the images.

10. The image evaluation apparatus of claim 9, wherein
the objects included in the images each belong to one of a plurality of object clusters, and
the evaluation unit calculates an importance degree of each of the object clusters in addition to the importance degrees of the images and the importance degrees of the photographers, the calculation of importance degrees being performed such that importance propagates from the importance degrees of the images to the importance degrees of the object clusters.

11. The image evaluation apparatus of claim 1, wherein the processor further operates as:
a creating unit that creates a data structure including a plurality of image elements respectively indicating the plurality of images,
a plurality of object cluster elements respectively indicating object clusters that the objects belong to, and
a plurality of photographer elements respectively indicating the photographers of the images,
a first link setting unit that sets, for each of the images, a value of a link between the image element corresponding to the image and the photographer element corresponding to the photographer of the image according to the likelihood degree; and
a second link setting unit that sets, for each of the images, a value of a link between an image element corresponding to the image and an object cluster element corresponding to an object cluster that the object belongs to according to the characteristic value, and
the evaluation unit calculates, for each of the images, the importance degree of the image according to the values of the links set with respect to the image element corresponding to the image.

12. The image evaluation apparatus of claim 11, wherein
the creating unit sets, for each of the images, one of the object cluster elements as a main subject element indicating a main subject of the evaluation performed with respect to the image, the main subject corresponding to the photographer element in the data structure, and
the first link-setting unit sets, for each of the images, a value of a link between the main subject element and the image element corresponding to the image, the main subject being specified as the photographer of the image.

13. The image evaluation apparatus of claim 11, wherein
the data structure includes:
image nodes as the image elements;
object cluster nodes as the object cluster elements; and
a photographer node as the photographer element,
the first link setting unit sets, for each of the images, a value of a link between an image node corresponding to the image and the photographer node,
the second link setting unit sets, for each of the images, a value of a link between the image node and an object cluster node corresponding to the object cluster that the object belongs to,
the processor further operates as an adjacency matrix generating unit that generates an adjacency matrix representing a graph that includes each of the nodes created by the creating unit and the values of the links set by the first link setting unit and the second link setting unit,
the evaluation unit includes:
an eigenvector calculating unit calculating a dominant eigenvector for the adjacency matrix; and
an importance degree calculating unit calculating, for each of the images, an importance degree of the image and an importance degree of the object cluster according to elements of the dominant eigenvector.

14. An image evaluation method for calculating an importance degree of each of a plurality of images including objects, the image evaluation method comprising:
a characteristic value calculating step of calculating, for each of the objects appearing in each of the images, a characteristic value indicating a state of appearance of the object;
a photographer extracting step of, for each of the images, (i) determining a photographer of the image and (ii) calculating a likelihood degree indicating accuracy of the determination of the photographer; and an evaluation step of calculating an importance degree of each of the images according to the characteristic values of the objects in the images and the likelihood degrees of the photographers in the images.

15. A program stored on a non-transitory medium, the program causing a computer to execute image evaluation processing of calculating an importance degree of each of a plurality of images including objects, wherein the image evaluation processing includes:
- a characteristic value calculating step of calculating, for each of the objects appearing in each of the images, a characteristic value indicating a state of appearance of the object;
- a photographer extracting step of, for each of the images, (i) determining a photographer of the image and (ii) calculating a likelihood degree indicating accuracy of the determination of the photographer; and
- an evaluation step of calculating an importance degree of each of the images according to the characteristic values of the objects in the images and the likelihood degrees of the photographers of the images.

16. An integrated circuit that calculates an importance degree of each of a plurality of images including objects, the integrated circuit comprising:
- a processor; and
- a non-transitory memory storing executable instructions, which when executed, cause the processor to operate as:
  - a characteristic value calculating unit that calculates, for each of the objects appearing in each of the images, a characteristic value indicating a state of appearance of the object;
  - a photographer extracting unit that, for each of the images, (i) determines a photographer of the image and (ii) calculates a likelihood degree indicating accuracy of the determination of the photographer; and
  - an evaluation unit that calculates an importance degree of each of the images according to the characteristic values of the objects in the images and the likelihood degrees of the photographers of the images.

* * * * *